(12) United States Patent
Kim et al.

(10) Patent No.: US 12,408,715 B2
(45) Date of Patent: Sep. 9, 2025

(54) PROTECTIVE FABRIC AND GARMENTS MADE THEREFROM

(71) Applicant: Kimberly-Clark Worldwide, Inc., Neenah, WI (US)

(72) Inventors: KyoungRock Kim, Gyeonggi-do (KR); HoMyung Yang, Gyeonggi-do (KR); YoonJae Park, Gyeonggi-do (KR); J. David Tucker, Canton, GA (US); Shawn Jenkins, Suwanee, GA (US); Fang Wang, Alpharetta, GA (US); Patricia H. Calhoun, Alpharetta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 185 days.

(21) Appl. No.: 17/911,225

(22) PCT Filed: Apr. 13, 2020

(86) PCT No.: PCT/US2020/027930
§ 371 (c)(1),
(2) Date: Sep. 13, 2022

(87) PCT Pub. No.: WO2021/211086
PCT Pub. Date: Oct. 21, 2021

(65) Prior Publication Data
US 2023/0094829 A1 Mar. 30, 2023

(51) Int. Cl.
*A41D 31/12* (2019.01)
*A41D 13/02* (2006.01)
(Continued)

(52) U.S. Cl.
CPC .......... *A41D 31/125* (2019.02); *A41D 13/02* (2013.01); *B32B 5/022* (2013.01); *B32B 5/26* (2013.01);
(Continued)

(58) Field of Classification Search
CPC .. A41D 31/125; A41D 13/02; A41D 13/1209; A41D 2500/30; B32B 5/022;
(Continued)

(56) References Cited

U.S. PATENT DOCUMENTS 5,589,258 A 12/1996 Maddern et al.
5,597,647 A 1/1997 Powers et al.
(Continued)

FOREIGN PATENT DOCUMENTS

CN 101080319 A 11/2007
WO WO2006065854 A2 6/2006

OTHER PUBLICATIONS

International Search Report and Written Opinion for PCT/US2020/027930 dated Jan. 12, 2021, 11 pages.
(Continued)

*Primary Examiner* — Camie S Thompson
(74) *Attorney, Agent, or Firm* — Dority & Manning, P.A.

(57) ABSTRACT

A wettable barrier fabric is provided that exhibits barrier function to dry particles and splashed liquids while also exhibiting wettability and wicking properties. A garment formed from a wettable barrier fabric that has good absorption properties and that retains good barrier properties is also provided.

27 Claims, 3 Drawing Sheets

(51) Int. Cl.
*B32B 5/02* (2006.01)
*B32B 5/26* (2006.01)
*B32B 23/10* (2006.01)

(52) U.S. Cl.
CPC .......... *B32B 23/10* (2013.01); *A41D 2500/30* (2013.01); *B32B 2250/03* (2013.01); *B32B 2250/04* (2013.01); *B32B 2262/0253* (2013.01); *B32B 2307/718* (2013.01); *B32B 2307/73* (2013.01); *B32B 2571/00* (2013.01)

(58) Field of Classification Search
CPC B32B 5/024; B32B 5/026; B32B 5/08; B32B 5/26; B32B 23/10; B32B 27/08; B32B 27/12; B32B 27/20; B32B 27/205; B32B 27/302; B32B 27/304; B32B 27/306; B32B 27/308; B32B 27/32; B32B 27/34; B32B 27/36; B32B 27/40; B32B 2250/03; B32B 2250/04; B32B 2250/05; B32B 2571/00; B32B 2262/0215; B32B 2262/023; B32B 2262/0253; B32B 2262/0261; B32B 2262/0276; B32B 2262/0284; B32B 2262/12; B32B 2262/0292; B32B 2264/062; B32B 2264/067; B32B 2264/102; B32B 2264/104; B32B 2264/108; B32B 2274/00; B32B 2308/51; B32B 2308/18; B32B 2308/724; B32B 2308/728; B32B 2308/73
USPC ................ 442/340, 346, 351, 382, 389, 903
See application file for complete search history.

(56) References Cited

U.S. PATENT DOCUMENTS

| | | | |
|---|---|---|---|
| 6,029,274 A | * | 2/2000 | Welchel ................. A41D 13/02 2/71 |
| 6,624,100 B1 | | 9/2003 | Pike |
| 2004/0123939 A1 | | 7/2004 | Griesbach et al. |
| 2008/0139070 A1 | | 6/2008 | Matthews |
| 2011/0217894 A1 | * | 9/2011 | Coslett ..................... D04H 3/14 442/382 |

OTHER PUBLICATIONS

Chinese Search Report Corresponding to Application No. 202080100460.5 on Mar. 21, 2024.

* cited by examiner

PROTECTIVE FABRIC AND GARMENTS MADE THEREFROM

RELATED APPLICATIONS

The present application is the National Stage entry of International Patent Application No. PCT/US2020/027930, filed on Apr. 13, 2020, which is incorporated herein by reference.

BACKGROUND OF THE DISCLOSURE

There are many types of limited-use or disposable protective garments designed to provide barrier properties. For example, garments, such as coveralls and other dust and chemical protective garments, can be used to effectively seal off a wearer from a harmful environment in ways that open or cloak style garments (for example, drapes, gowns and the like) are unable to do. Accordingly, coveralls have many applications where isolation of a wearer is desirable. Such protective apparel keeps clothing clean and keeps dirt and other residue off of the wearers skin. For a variety of reasons, it is undesirable for dust, hazardous liquids and/or pathogens that may be carried by liquids or present in the environment to pass through protective apparel. It is also highly desirable to use protective apparel to isolate persons from dusts, powders, and other particulates that may be present in a workplace or accident site. Conversely, in cleanroom, critical manufacturing, and surgical environments, the protective apparel protects the environment from dust and debris that may otherwise be carried into the environment by the wearer.

Unfortunately, conventional fabrics used for such garments, and thus the garments themselves, may trap moisture, which can dampen the wearer and result in an uncomfortable work environment, as well as put the wearer at risk of cold stress or overheating due to poor wicking. Furthermore, in some environments, the trapped moisture may become unsanitary or dangerous to the user, as trapped moisture may drip to the extremities, hindering the actions of the wearer as well as the protective equipment. To avoid at least some of these shortcomings, breathable garments have been developed that allow vapor produced by the body to be removed. Unfortunately, one of the common problems associated with many conventional types of breathable fabrics is that they have poor barrier functions, thus having ineffective repellency against dust and chemicals. Therefore, thus far, a fabric and/or garment having both adequate barrier properties and wicking properties, has not been provided As such, a need currently exists for a garment that exhibits barrier properties and that is also moisture wicking. It would be a further advantage to provide a liner for protective apparel that has good barrier properties and wicking properties. It would also be a benefit to provide a protective garment having a liner formed from a wicking and protective liner.

SUMMARY OF THE DISCLOSURE

In general, one aspect of the present disclosure is directed to a wettable barrier fabric. The wettable barrier fabric includes an inner first spunbond layer, a meltblown layer, and an outer second spunbond layer. The inner first spunbond layer and/or the meltblown layer include fibers having a polymer and about 0.1 wt. % to about 20 wt. % of a wetting agent, and the wettable barrier fabric prevents at least about 40% of dry particles having a size of about 0.1 microns or greater from passing through the fabric.

In one aspect, the inner spunbond layer and the meltblown layer both include fibers having about 0.1 wt. % to about 20 wt. % of a wetting agent. Furthermore, in an aspect, inner first spunbond layer, the meltblown layer, and/or the outer second spunbond layer include polyolefin-based fibers. In an aspect, the polymer of one or more of the inner first spunbond layer, the meltblown layer, and the other second spunbond layer includes a propylene homopolymer, propylene/α-olefin copolymer, ethylene/α-olefin copolymer, or a combination thereof.

In yet a further aspect, the outer second spunbond layer is hydrophobic. Additionally or alternatively, the outer second spunbond layer is generally free of wetting agent. Moreover, in an aspect, the outer second spunbond layer is laminated to a film.

Additionally or alternatively, in an aspect, the inner first spunbond layer, the meltblown layer, or both the inner first spunbond layer and the meltblown layer have an absorption capacity of 10% to 1000% of the weight of the respective layer or layers. Furthermore, in one aspect, the fabric has a basis weight of about 5 grams per square meter (gsm) to about 300 gsm. In yet a further aspect, the liquid spread speed of the inner first spunbond layer is about 1 mm/sec or greater according to AATC 195 (2017).

An aspect of the present disclosure is also generally directed to a protective garment. The protective garment is formed from a wettable barrier fabric that includes at least a first inner nonwoven layer and an outer layer. The first inner nonwoven layer includes fibers having a polymer and about 0.1 wt. % to about 20 wt. % of a wetting agent.

In one aspect, the outer layer of the protective garment is generally free of wetting agent. Furthermore, in an aspect, the first inner nonwoven layer is a spunbond layer formed from fibers including the polymer and the wetting agent. Additionally or alternatively, in an aspect, the outer layer is a film or a second spunbond layer.

In one aspect, the fabric further includes a second inner layer between the first inner layer and the outer layer, where the second inner layer is a meltblown layer formed from fibers including a polyolefin and about 0.1 wt. % to about 20 wt. % of a wetting agent.

Furthermore, in one aspect, the protective garment prevents at least about 40% of dry particles having a size of about 0.1 microns or greater from passing through the protective garment. In an aspect, the first inner nonwoven layer has an absorption capacity of about 10% to about 1000% based upon the weight of the inner nonwoven layer. Additionally or alternatively, in an aspect, the garment has an absorption capacity of about 50% to about 500% based upon the weight of the fabric. In yet another aspect, the fabric has a basis weight of about 5 grams per square meter (gsm) to about 300 gsm.

Moreover, in an aspect, the protective garment further comprises a second outer layer laminated to the first outer layer on a side opposite the first inner nonwoven layer, where the second outer layer includes nonwoven fibers.

Additionally, in general, one aspect of the present disclosure is directed to a wettable barrier fabric. The wettable barrier fabric includes an inner first spunbond layer and an outer film layer. The inner first spunbond layer includes fibers having a polymer and about 0.1 wt. % to about 20 wt. % of a wetting agent, and the wettable barrier fabric prevents at least about 40% of dry particles having a size of about 0.1 microns or greater from passing through the fabric.

In one aspect, the fabric further includes an outer spunbond layer located between the inner first spunbond layer and the outer film layer, or on a side of the outer film layer opposite the inner first spunbond layer. Furthermore, in an aspect, the wettable barrier fabric is an elastic laminate. Additionally or alternatively, the outer film layer includes elastic fibers or strands In yet a further aspect, the outer second spunbond layer, the outer film layer, or both the outer second spunbond layer and the outer film layer is hydrophobic. Additionally or alternatively, the fabric further includes at least one nonwoven layer disposed between the first inner spunbond layer and the outer film layer. Moreover, in an aspect, the fabric further includes at least one nonwoven layer disposed between the outer spunbond layer and the outer film layer, wherein the outer spunbond layer is disposed on the side of the outer film layer opposite the inner first spunbond layer.

Additionally or alternatively, in an aspect, the inner first spunbond layer has an absorption capacity of 10% to 1000% of the weight of the respective layer or layers. Furthermore, in one aspect, the fabric has a basis weight of about 5 grams per square meter (gsm) to about 300 gsm. In yet a further aspect, the liquid spread speed of the inner first spunbond layer is about 1 mm/sec or greater according to AATC 195 (2017).

An aspect of the present disclosure is also generally directed to a protective garment. The protective garment is formed from a wettable barrier fabric that includes at least a first inner nonwoven layer and an outer film layer. The first inner nonwoven layer includes fibers having a polymer and about 0.1 wt. % to about 20 wt. % of a wetting agent.

In one aspect, the outer film layer of the protective garment is generally free of wetting agent. Furthermore, in an aspect, the first inner nonwoven layer is a spunbond layer formed from fibers including the polymer and the wetting agent. Additionally or alternatively, in an aspect, the wettable barrier fabric is an elastic laminate.

In one aspect, the fabric further includes a second inner layer between the first inner layer and the outer layer, where the second inner layer is a meltblown layer formed from fibers including a polyolefin and about 0.1 wt. % to about 20 wt. % of a wetting agent. Furthermore, in one aspect, the protective garment prevents at least about 40% of dry particles having a size of about 0.1 microns or greater from passing through the protective garment. In an aspect, the first inner nonwoven layer has an absorption capacity of about 10% to about 1000% based upon the weight of the inner nonwoven layer. Additionally or alternatively, in an aspect, the garment has an absorption capacity of about 50% to about 500% based upon the weight of the fabric. In yet another aspect, the fabric has a basis weight of about 5 grams per square meter (gsm) to about 300 gsm.

Moreover, in an aspect, the protective garment further comprises a second outer layer laminated to the first outer layer on a side opposite the first inner nonwoven layer, where the second outer layer includes nonwoven fibers.

Other features and aspects of the present disclosure are discussed in greater detail below.

BRIEF DESCRIPTION OF THE DRAWINGS

A full and enabling disclosure of the present disclosure, including the best mode thereof, directed to one of ordinary skill in the art, is set forth more particularly in the remainder of the specification, which makes reference to the appended figures in which.

Figure 1:
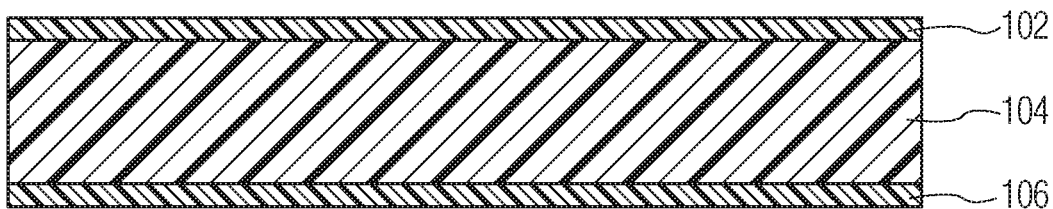
FIG. 1 illustrates a cross section of a liner according to the present disclosure.

Repeat use of references characters in the present specification and drawings is intended to represent same or analogous features or elements of the disclosure.

DETAILED DESCRIPTION

Definitions

As used herein, the terms "about," "approximately," or "generally," when used to modify a value, indicates that the value can be raised or lowered by 10% and remain within the disclosed aspect.

As used herein, the term "fibers" generally refer to elongated extrudates that may be formed by passing a polymer through a forming orifice, such as a die. Unless noted otherwise, the term "fibers" includes discontinuous fibers having a definite length (e.g., stable fibers) and substantially continuous filaments. Substantially filaments may, for instance, have a length much greater than their diameter, such as a length to diameter ratio ("aspect ratio") greater than about 15,000 to 1, and in some cases, greater than about 50,000 to 1.

As used herein the term "nonwoven web" generally refers to a web having a structure of individual fibers or threads which are interlaid, but not in an identifiable manner as in a knitted fabric. Examples of suitable nonwoven fabrics or webs include, but are not limited to, meltblown webs, spunbond webs, bonded carded webs, airlaid webs, coform webs, hydraulically entangled webs, and so forth.

As used herein, the term "meltblown web" generally refers to a nonwoven web that is formed by a process in which a molten thermoplastic material is extruded through a plurality of fine, usually circular, die capillaries as molten fibers into converging high velocity gas (e.g., air) streams that attenuate the fibers of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin, et al., which is incorporated herein in its entirety by reference thereto for all purposes. Generally speaking, meltblown fibers may be microfibers that are substantially continuous or discontinuous, generally smaller than 10 microns in diameter, and generally tacky when deposited onto a collecting surface.

As used herein, the term "spunbond web" generally refers to a web containing small diameter substantially continuous fibers. The fibers are formed by extruding a molten thermoplastic material from a plurality of fine, usually circular, capillaries of a spinnerette with the diameter of the extruded fibers then being rapidly reduced as by, for example, eductive drawing and/or other well-known spunbonding mechanisms. The production of spunbond webs is described and illustrated, for example, in U.S. Pat. No. 4,340,563 to Appel, et al., U.S. Pat. No. 3,692,618 to Dorschner, et al., U.S. Pat. No. 3,802,817 to Matsuki, et al., U.S. Pat. No. 3,338,992 to Kinney, U.S. Pat. No. 3,341,394 to Kinney, U.S. Pat. No. 3,502,763 to Hartman, U.S. Pat. No. 3,502,538 to Levy, U.S.

Pat. No. 3,542,615 to Dobo, et al., and U.S. Pat. No. 5,382,400 to Pike, et al., which are incorporated herein in their entirety by reference thereto for all purposes. Spunbond fibers are generally not tacky when they are deposited onto a collecting surface. Spunbond fibers may sometimes have diameters less than about 40 microns and are often between about 5 to about 20 microns.

As used herein, the term "coform" generally refers to composite materials comprising a mixture or stabilized matrix of thermoplastic fibers and a second non-thermoplastic material. As an example, coform materials may be made by a process in which at least one meltblown die head is arranged near a chute through which other materials are added to the web while it is forming. Such other materials may include, but are not limited to, fibrous organic materials such as woody or non-woody pulp such as cotton, rayon, recycled paper, pulp fluff and also superabsorbent particles, inorganic and/or organic absorbent materials, treated polymeric staple fibers and so forth. Some examples of such coform materials are disclosed in U.S. Pat. No. 4,100,324 to Anderson, et al., U.S. Pat. No. 5,284,703 to Everhart, et al., and U.S. Pat. No. 5,350,624 to Georger, et al., each of which are incorporated herein in their entirety by reference thereto for all purposes.

As used herein, the term "thermal point bonding" generally refers to a process performed, for example, by passing a material between a patterned roll (e.g., calender roll) and another roll (e.g., anvil roll), which may or may not be patterned. One or both of the rolls are typically heated. As used herein, the term "ultrasonic bonding" generally refers to a process performed, for example, by passing a material between a sonic horn and a patterned roll (e.g., anvil roll). For instance, ultrasonic bonding through the use of a stationary horn and a rotating patterned anvil roll is described in U.S. Pat. No. 3,939,033 to Grqach, et al., U.S. Pat. No. 3,844,869 to Rust Jr., and U.S. Pat. No. 4,259,399 to Hill, which are incorporated herein in their entirety by reference thereto for all purposes. Moreover, ultrasonic bonding through the use of a rotary horn with a rotating patterned anvil roll is described in U.S. Pat. No. 5,096,532 to Neuwirth, et al., U.S. Pat. No. 5,110,403 to Ehlert, and U.S. Pat. No. 5,817,199 to Brennecke, et al., which are incorporated herein in their entirety by reference thereto for all purposes. Of course, any other ultrasonic bonding technique may also be used in the present disclosure.

As used herein, the term "liquid resistant" refers to material having a hydrostatic head of at least about 25 centimeters as determined in accordance with the standard hydrostatic pressure test AATCC™ No. 1998 with the following exceptions: (1) the samples are larger than usual and are mounted in a stretching frame that clamps onto the cross-machine direction ends of the sample, such that the samples may be tested under a variety of stretch conditions (e.g., 10%, 20%, 30%, 40% stretch); and (2) the samples are supported underneath by a wire mesh to prevent the sample from sagging under the weight of the column of water.

As used herein, the term "breathable" in regards to nonwoven fabrics alone refers to material having a Frazier porosity of at least about 2 cubic feet per minute per square foot (cfm/ft$^2$). For example, the Frazier porosity of a breathable material may be from about 25 to more than 45 cfm/ft$^2$. The Frazier porosity is determined utilizing a Frazier Air Permeability Tester available from the Frazier Precision Instrument Company. The Frazier porosity is measured in accordance with Federal Test Method 5450, Standard No. 191A, except that the sample size is 8"×8" instead of 7"×7". More typically, the air permeability may be in the range from about 5 or 10 cfm to about 43 or 45 cfm, and preferably between about 15, 17, 20, or 25 cfm to about 40 or 42 cfm.

For laminates that utilize one or more film layers, "breathable" refers to the water vapor transmission rate (WVTR"). The test used to determine the WVTR of a material may vary based on the nature of the material. One technique for measuring the WVTR value is ASTM E96/96M-12, Procedure B. Another method involves the use of INDA Test Procedure IST-70.4 (01). The INDA test procedure is summarized as follows. A dry chamber is separated from a wet chamber of known temperature and humidity by a permanent guard film and the sample material to be tested. The purpose of the guard film is to define a definite air gap and to quiet or still the air in the air gap while the air gap is characterized. The dry chamber, guard film, and the wet chamber make up a diffusion cell in which the test film is sealed. The sample holder is known as the Permatran-W Model 100K manufactured by Mocon/Modem Controls, Inc., Minneapolis, Minn. A first test is made of the WVTR of the guard film and the air gap between an evaporator assembly that generates 100% relative humidity. Water vapor diffuses through the air gap and the guard film and then mixes with a dry gas flow that is proportional to water vapor concentration. The electrical signal is routed to a computer for processing. The computer calculates the transmission rate of the air gap and the guard film and stores the value for further use.

The transmission rate of the guard film and air gap is stored in the computer as CaIC. The sample material is then sealed in the test cell. Again, water vapor diffuses through the air gap to the guard film and the test material and then mixes with a dry gas flow that sweeps the test material. Also, again, this mixture is carried to the vapor sensor. The computer then calculates the transmission rate of the combination of the air gap, the guard film, and the test material. This information is then used to calculate the transmission rate at which moisture is transmitted through the test material according to the equation:

$$TR_{testmaterial} = TR_{testmaterial,guardfilm,airgap} - TR_{guardfilm, airgap}$$

The water vapor transmission rate ("WVTR") is then calculated as follows:

$$WVTR = F \cdot \rho_{sat}(T) \cdot RH \, AP \, sat(T) \cdot (1-RH)$$

wherein,

F=the flow of water vapor in cm$^3$ per minute;

$\rho_{sat(T)}$=the density of water in saturated air at temperature T;

RH=the relative humidity at specified locations in the cell;

A=the cross sectional area of the cell; and $P_{sat(T)}$=the saturation vapor pressure of water vapor at temperature T, As referred to here, a breathable film may have a water vapor transmission rate ("WVTR") of at least about 300 grams/m$^2$-24 hours, such as about 1000 grams/m$^2$-24 hours or greater, such as about 1500 grams/m$^2$-24 hours or greater, such as about 2000 grams/m$^2$-24 hours or greater, such as about 2500 grams/m$^2$-24 hours, such as about 3000 grams/m$^2$-24 hours or greater, up to about 4700 grams/m$^2$-24 hours.

As used herein, the term "particle resistant" refers to a fabric having a useful level resistance to penetration by particulates. Resistance to penetration by particulates may be measured by determining the air filter retention of dry particles and can be expressed as particle holdout efficiency. More specifically, particle hold-out efficiency refers to the efficiency of a material at preventing the passage of particles of a certain size range through the material. Particle holdout efficiency may be measured by determining the air filter retention of dry particles utilizing tests such as, for example, IBR Test Method No. E-217, Revision G (Jan. 15, 1991) performed by InterBasic Resources, Inc. of Grass Lake, Mich. Generally speaking, high particle holdout efficiency is desirable for barrier materials/fabrics. Desirably, a particle resistant material should have a particle holdout efficiency of at least about 40 percent, such as at least about 50%, such as at least about 60%, such as at least about 70%, such as at least about 80%, such as at least about 90% or more, for particles having a diameter greater than about 0.05 microns, such as about 0.1 micron.

As used herein, the term "aerosol" insofar as used in regards to barrier properties to aerosols, refers to a suspension of solid, liquid, or solid and liquid particles in a gaseous medium having negligible falling velocity, such as less than about 0.25 m/s.

As used herein, "mist resistance" may be measured according to ISO 17491-4 modified for low-level spray testing conditions, four hydraulic nozzles shall be hollow cone type nozzles, with a spray angle of (75±5)° at 3 bar, each nozzle supplying liquid at a rate of (0.47±0.05) l/min at 300 kPa pressure, the liquid used shall be modified to have a surface tension of (52.5±7.5). 10-3 N/m in order to form suitable spray droplets; calibration of the test apparatus shall also be carried out with test liquid at the same surface tension.

DETAILED DESCRIPTION

Reference now will be made in detail to various aspects of the present disclosure, one or more examples of which are set forth below. Each example is provided by way of explanation of the present disclosure, not limitation of the present disclosure. In fact, it will be apparent to those skilled in the art that various modifications and variations may be made in the present disclosure without departing from the scope or spirit of the present disclosure. For instance, features illustrated or described as part of one aspect, may be used on another aspect to yield a still further aspect. Thus, it is intended that the present disclosure covers such modifications and variations as come within the scope of the appended claims and their equivalents.

Generally speaking, the present disclosure is directed to a barrier fabric that has excellent wetting properties while maintaining good barrier function. Particularly, the present disclosure has found that by incorporating a wetting agent into an inner portion or layer (e.g. a portion of the fabric that faces the body of a wearer) of a barrier fabric as a melt additive or as a topical treatment, while leaving the exterior portion or layer (e.g. externally facing portion of the fabric, composite, or garment made therefrom) generally free of wetting agent, the barrier fabric may exhibit excellent wetting and wicking properties and also maintain good barrier properties. Particularly, as will be discussed in greater detail below, and as an example of one laminate according to the present disclosure, a spunbond-meltblown-spunbond fabric according to the present disclosure may have an inner spunbond layer and/or a meltblown layer with a wetting agent incorporated as a melt additive or a topical treatment, while the outer spunbond layer may be generally free of the wetting agent and instead may be generally hydrophobic, and may exhibit good wicking and wetting properties on an interior side, while still exhibiting barrier function.

The barrier fabric(s) according to the present disclosure are generally wettable and breathable, as well as being liquid and/or dust resistant barrier materials. The wettability and breathability of the material increases the comfort of someone wearing such a garment, especially if the garment is worn under high heat index conditions, vigorous physical activity, or long periods of time, as breathability can work in conjunction with the wetting properties of the fabric to wick moisture away from the wearer and facilitate evaporation. Of course, in one aspect, discussed below, a fabric laminate according to the present disclosure may include a film. As discussed above, films according to the present disclosure are generally breathable, and have water vapor transmission rates according to the above definition. However, in one aspect, one or more films used according to the present disclosure may be somewhat or completely non-transmittable to moisture.

The material used to form the garment may be two or more layers of one or more of, bonded carded webs, webs of spunbonded fibers, webs of meltblown fibers, webs of spunlaced fibers, webs of other nonwoven materials, one or more knit or woven materials, one or more films, and combinations thereof. Multiple layers (e.g. two or more layers) of seamless sheet material may be joined into a seamless laminate and used to form garments having desirable barrier properties. Laminates can be formed by combining layers of seamless sheet materials with each other and/or forming or depositing layers of such materials on each other. For example, the material may be a laminate of two or more nonwoven webs. As a further example, the material may be a laminate of at least one web of spunbonded fibers and at least one web of meltblown fibers and mixtures thereof.

For example, useful multi-layer materials may be made by joining at least one web of meltblown fibers (which may include meltblown microfibers) with at least one spunbonded continuous filament web. An exemplary multi-layer seamless material useful for making the barrier fabric of the present disclosure is a nonwoven laminated fabric constructed by bonding together layers of spunbonded continuous filaments webs and webs of meltblown fibers (which may include meltblown microfibers) and may also include a bonded carded web or other nonwoven fabric.

Referring to FIG. 1, an exemplary three-layer fabric 100 having an inner layer 102 of a spunbonded web, a middle layer 104 of a meltblown web, and an outer layer 106 of a spunbonded web may be referred to in shorthand notation as SMS. Such fabrics are described in detail in U.S. Pat. Nos. 4,041,203, 4,374,888, and 4,753,843, all of which patents are assigned to the Kimberly-Clark Corporation, the assignee of the present disclosure. However, as will be discussed in greater detail below, the fabric according to the present disclosure may have an inner layer 102 and, in one aspect, an inner layer 102 and/or a middle layer 104, that have a wetting agent incorporated into the polymer blend as a melt additive or a topical treatment, where the outer layer 106 may be generally free of wetting agent. Thus, an SMS fabric according to the present disclosure may exhibit excellent wettability and may therefore be able to wick moisture away from the skin of a wearer, while maintaining adequate barrier properties due to the unique combination of SMS fabric, treated inner and/or middle layer, and untreated outer layer.

Nonetheless, exemplary polymers that can be used in forming any or each of the two or more nonwoven web(s) can include olefins (e.g., polyethylene and polypropylenes), polyesters (e.g., polybutylene terephthalate, polybutylene naphthalate), polyamides (e.g., nylons), polycarbonates, polyphenylene sulfides, polystyrenes, polyurethanes (e.g., thermoplastic polyurethanes), etc. In one particular aspect, the fibers of the nonwoven web material can include an olefin homopolymer. One suitable olefin homopolymer is a propylene homopolymer having a density of 0.91 grams per cubic centimeter (g/cm$^3$), a melt flow rate of 1200 g/10 minute (230° C., 2.16 kg), a crystallization temperature of 113° C., and a melting temperature of 156° C., and is available as METOCENE MF650X polymer from Lyondell-Basell Industries in Rotterdam, The Netherlands. Another suitable propylene homopolymer that can be used has a density of 0.905 g/cm$^3$, a melt flow rate of 1300 g/10 minute (230° C., 2.16 kg), and a melting temperature of 165° C., and is available as Polypropylene 3962 from Total Petrochemicals in Houston, Tex. Another suitable polypropylene is available as EXXTRAL™ 3155, available from ExxonMobil Chemical Company of Houston, Tex.

Further, a variety of thermoplastic elastomeric and plastomeric polymers may generally be employed in the nonwoven web material of the present disclosure, such as elastomeric polyesters, elastomeric polyurethanes, elastomeric polyamides, elastomeric copolymers, elastomeric polyolefins, and so forth. In one particular aspect, elastomeric semi-crystalline polyolefins are employed due to their unique combination of mechanical and elastomeric properties. Semi-crystalline polyolefins have or are capable of exhibiting a substantially regular structure. For example, semi-crystalline polyolefins may be substantially amorphous in their undeformed state but form crystalline domains upon stretching. The degree of crystallinity of the olefin polymer may be from about 3% to about 60%, in some aspects from about 5% to about 45%, in some aspects from about 5% to about 30%, and in some aspects, from about 5% and about 15%. Likewise, the semi-crystalline polyolefin may have a latent heat of fusion ($\Delta H_f$), which is another indicator of the degree of crystallinity, of from about 15 to about 210 Joules per gram ("J/g"), in some aspects from about 20 to about 100 J/g, in some aspects from about 20 to about 65 J/g, and in some aspects, from 25 to about 50 J/g. The semi-crystalline polyolefin may also have a Vicat softening temperature of from about 10° C. to about 100° C., in some aspects from about 20° C. to about 80° C., and in some aspects, from about 30° C. to about 60° C. The semi-crystalline polyolefin may have a melting temperature of from about 20° C. to about 120° C., in some aspects from about 35° C. to about 90° C., and in some aspects, from about 40° C. to about 80° C. The latent heat of fusion ($\Delta H_f$) and melting temperature may be determined using differential scanning calorimetry ("DSC") in accordance with ASTM D-3417 as is well known to those skilled in the art. The Vicat softening temperature may be determined in accordance with ASTM D-1525.

Exemplary semi-crystalline polyolefins include polyethylene, polypropylene, as well as their blends and copolymers thereof. In one particular aspect, a polyethylene is employed that is a copolymer of ethylene and an α-olefin, such as a $C_3$-$C_{20}$ α-olefin or $C_3$-$C_{12}$ α-olefin. Suitable α-olefins may be linear or branched (e.g., one or more $C_1$-$C_3$ alkyl branches, or an aryl group). Specific examples include 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin comonomers are 1-butene, 1-hexene, and 1-octene. The ethylene content of such copolymers may be from about 60 mole % to about 99 mole %, in some aspects from about 80 mole % to about 98.5 mole %, and in some aspects, from about 87 mole % to about 97.5 mole %. The α-olefin content may likewise range from about 1 mole % to about 40 mole %, in some aspects from about 1.5 mole % to about 15 mole %, and in some aspects, from about 2.5 mole % to about 13 mole %.

The density of the polyethylene may vary depending on the type of polymer employed, but generally ranges from about 0.85 g/cm$^3$ to about 0.96 g/cm$^3$. Polyethylene "plastomers", for instance, may have a density in the range of from 0.85 g/cm$^3$ to 0.91 g/cm$^3$. Likewise, "linear low density polyethylene" ("LLDPE") may have a density in the range of from about 0.91 g/cm$^3$ to about 0.94 g/cm$^3$; "low density polyethylene" ("LDPE") may have a density in the range of from about 0.91 g/cm$^3$ to about 0.94 g/cm$^3$; and "high density polyethylene" ("HDPE") may have density in the range of from 0.94 g/cm$^3$ to 0.96 g/cm$^3$. Densities may be measured in accordance with ASTM 1505. Particularly suitable polyethylene copolymers are those that are "linear" or "substantially linear." The term "substantially linear" means that, in addition to the short chain branches attributable to comonomer incorporation, the ethylene polymer also contains long chain branches in the polymer backbone. "Long chain branching" refers to a chain length of at least 6 carbons. Each long chain branch may have the same comonomer distribution as the polymer backbone and be as long as the polymer backbone to which it is attached. Preferred substantially linear polymers are substituted with from 0.01 long chain branch per 1000 carbons to 1 long chain branch per 1000 carbons, and in some aspects, from 0.05 long chain branch per 1000 carbons to 1 long chain branch per 1000 carbons. In contrast to the term "substantially linear", the term "linear" means that the polymer lacks measurable or demonstrable long chain branches. That is, the polymer is substituted with an average of less than 0.01 long chain branch per 1000 carbons.

The density of a linear ethylene/α-olefin copolymer is a function of both the length and amount of the α-olefin. That is, the greater the length of the α-olefin and the greater the amount of α-olefin present, the lower the density of the copolymer. Although not necessarily required, linear polyethylene "plastomers" are particularly desirable in that the content of α-olefin short chain branching content is such that the ethylene copolymer exhibits both plastic and elastomeric characteristics — i.e., a "plastomer." Because polymerization with α-olefin comonomers decreases crystallinity and density, the resulting plastomer normally has a density lower than that of polyethylene thermoplastic polymers (e.g., LLDPE), but approaching and/or overlapping that of an elastomer. For example, the density of the polyethylene plastomer may be 0.91 g/cm$^3$ or less, in some aspects, from about 0.85 g/cm$^3$ to about 0.88 g/cm$^3$, and in some aspects, from about 0.85 g/cm$^3$ to about 0.87 g/cm$^3$. Despite having a density similar to elastomers, plastomers generally exhibit a higher degree of crystallinity and may be formed into pellets that are non-adhesive and relatively free flowing.

The distribution of the α-olefin comonomer within a polyethylene plastomer is typically random and uniform among the differing molecular weight fractions forming the ethylene copolymer. This uniformity of comonomer distribution within the plastomer may be expressed as a comonomer distribution breadth index value ("CDBI") of 60 or more, in some aspects 80 or more, and in some aspects, 90 or more. Further, the polyethylene plastomer may be characterized by a DSC melting point curve that exhibits the occurrence of a single melting point peak occurring in the region of 50 to 110° C. (second melt rundown).

Suitable plastomers for use in the present disclosure are ethylene-based copolymer plastomers available under the designation EXACT™ from ExxonMobil Chemical Company of Houston, Tex. Other suitable polyethylene-based plastomers are available under the designation ENGAGE™ and AFFINITY™ from Dow Chemical Company of Midland, Mich. An additional suitable polyethylene-based plastomer is an olefin block copolymer available from Dow Chemical Company of Midland, Mich. under the trade designation INFUSE™, such as INFUSE™ 9807. A polyethylene that can be used in the fibers of the present disclosure is DOW™ 61800.41. Still other suitable ethylene polymers are available from The Dow Chemical Company under the designations DOWLEX™ (LLDPE), ASPUN™ (LLDPE), and ATTANE™ (ULDPE). Other suitable ethylene polymers are described in U.S. Pat. No. 4,937,299 to Ewen et al.; U.S. Pat. No. 5,218,071 to Tsutsui et al.; U.S. Pat. No. 5,272,236 to Lai, et al.; and U.S. Pat. No. 5,278,272 to Lai, et al., which are incorporated herein in their entirety by reference thereto for all purposes.

Of course, the present disclosure is by no means limited to the use of ethylene polymers. For instance, propylene polymers may also be suitable for use as a semi-crystalline polyolefin. Suitable plastomeric propylene polymers may include, for instance, copolymers or terpolymers of propylene include copolymers of propylene with an α-olefin (e.g., $C_3$-$C_{20}$), such as ethylene, 1-butene, 2-butene, the various pentene isomers, 1-hexene, 1-octene, 1-nonene, 1-decene, 1-unidecene, 1-dodecene, 4-methyl-1-pentene, 4-methyl-1-hexene, 5-methyl-1-hexene, vinylcyclohexene, styrene, etc. The comonomer content of the propylene polymer may be about 35 wt. % or less, in some aspects from about 1 wt. % to about 20 wt. %, and in some aspects, from about 2 wt. % to about 10 wt. %. Preferably, the density of the polypropylene (e.g., propylene/α-olefin copolymer) may be 0.91 grams per cubic centimeter (g/cm³) or less, in some aspects, from 0.85 to 0.88 g/cm³, and in some aspects, from 0.85 g/cm³ to 0.87 g/cm³. Suitable propylene-based copolymer plastomers are commercially available under the designations VISTAMAXX™ (e.g., 2330, 6202, and 6102), a propylene-ethylene copolymer-based plastomer from ExxonMobil Chemical Co. of Houston, Tex.; FINA™ (e.g., 8573) from Atofina Chemicals of Feluy, Belgium; TAFMER™ available from Mitsui Petrochemical Industries; and VERSIFY™ available from Dow Chemical Co. of Midland, Mich. Other examples of suitable propylene polymers are described in U.S. Pat. No. 6,500,563 to Datta, et al.; U.S. Pat. No. 5,539,056 to Yang, et al.; and U.S. Pat. No. 5,596,052 to Resconi, et al., which are incorporated herein in their entirety by reference thereto for all purposes.

Any of a variety of known techniques may generally be employed to form the semi-crystalline polyolefins. For instance, olefin polymers may be formed using a free radical or a coordination catalyst (e.g., Ziegler-Natta). Preferably, the olefin polymer is formed from a single-site coordination catalyst, such as a metallocene catalyst. Such a catalyst system produces ethylene copolymers in which the comonomer is randomly distributed within a molecular chain and uniformly distributed across the different molecular weight fractions. Metallocene-catalyzed polyolefins are described, for instance, in U.S. Pat. No. 5,571,619 to McAlpin et al.; U.S. Pat. No. 5,322,728 to Davis et al.; U.S. Pat. No. 5,472,775 to Obiieski et al.; U.S. Pat. No. 5,272,236 to Lai et al.; and U.S. Pat. No. 6,090,325 to Wheat, et al., which are incorporated herein in their entirety by reference thereto for all purposes. Examples of metallocene catalysts include bis(n-butylcyclopentadienyl)titanium dichloride, bis(n-butylcyclopentadienyl)zirconium dichloride, bis(cyclopentadienyl)scandium chloride, bis(indenyl)zirconium dichloride, bis(methylcyclopentadienyl)titanium dichloride, bis(methylcyclopentadienyl)zirconium dichloride, cobaltocene, cyclopentadienyltitanium trichloride, ferrocene, hafnocene dichloride, isopropyl(cyclopentadienyl,-1-flourenyl)zirconium dichloride, molybdocene dichloride, nickelocene, niobocene dichloride, ruthenocene, titanocene dichloride, zirconocene chloride hydride, zirconocene dichloride, and so forth. Polymers made using metallocene catalysts typically have a narrow molecular weight range. For instance, metallocene-catalyzed polymers may have polydispersity numbers ($M_w/M_n$) of below 4, controlled short chain branching distribution, and controlled isotacticity.

The melt flow index (MI) of the semi-crystalline polyolefins may generally vary, but is typically in the range of about 0.1 grams per 10 minutes to about 100 grams per 10 minutes, in some aspects from about 0.5 grams per 10 minutes to about 30 grams per 10 minutes, and in some aspects, about 1 to about 10 grams per 10 minutes, determined at 190° C. The melt flow index is the weight of the polymer (in grams) that may be forced through an extrusion rheometer orifice (0.0825-inch diameter) when subjected to a force of 5000 grams in 10 minutes at 190° C., and may be determined in accordance with ASTM Test Method D1238-E.

While the elastomer has been thus far generally discussed as a component of a fiber for a nonwoven, it should be understood that the fiber may contain both a core layer and a skin layer, where the core layer and the skin layer may contain the same elastomer(s) or a different elastomer or elastomer(s). For instance, in one aspect, the core layer may contain a polyethylene based copolymer elastomer as discussed above (e.g., INFUSE™), whereas the skin layer may contain a polypropylene based copolymer elastomer (e.g., VERSIFY™).

Additionally or Alternatively, the core layer and skin layer may each be formed from either a propylene based copolymer or an ethylene based copolymer (or any other elastomer discussed above), however, the core layer is formed from an elastomer having a "medium" to "high" molecular weight, whereas the skin layer is formed from an elastomer having a "low" molecular weight. For instance, in one aspect, the "medium" to "high" molecular weight elastomer can have a number average molecular weight of about 10,000 g/mol to about 70,000 g/mol, such as about 12,500 g/mol to about 67,500 g/mol, such as about 15,000 g/mol to about 65,000, such as about 17,500 g/mol to about 62,500 g/mol, such as about 20,000 g/mol to about 60,000 g/mol, or any ranges or values therebetween. Furthermore, a "low" molecular weight elastomer according to the present disclosure may have a number average molecular weight of about 1,000 g/mol to about 10,000 g/mol, such as about 2,000 g/mol to about 9,000 g/mol, such as about 3,000 g/mol to about 8,000 g/mol, such as about 4,000 g/mol to about 7,000 g/mol, such as about 4,500 g/mol to about 6,500 g/mol or any ranges or values therebetween.

For instance, in one aspect, a ratio of the average molecular weight of the total elastomer or elastomers in the core layer to a ratio of the average molecular weight of the total elastomer or elastomers in the skin layer may be from about 10:1 to about 1.1:1, such as about 7.5:1 to about 1.5:1, such as about 5:1 to about 2:1, or any ranges or valued therebetween. Without wishing to be bound by theory, the present disclosure has found that by using a lower molecular weight elastomer in the skin layer as compared to the core layer, an increase in tension forces upon stretching which are normally exhibited when using a non-blocking skin layer may be avoided. Thus, in one aspect, a lower molecular weight elastomer is used in the skin layer, which can further improve the elastic efficiency of the composition according to the present disclosure.

Of course, other thermoplastic polymers may also be used to form nonwoven web material. For instance, a substantially amorphous block copolymer may be employed that has at least two blocks of a monoalkenyl arene polymer separated by at least one block of a saturated conjugated diene polymer. The monoalkenyl arene blocks may include styrene and its analogues and homologues, such as o-methyl styrene; p-methyl styrene; p-tert-butyl styrene; 1,3 dimethyl styrene p-methyl styrene; etc., as well as other monoalkenyl polycyclic aromatic compounds, such as vinyl naphthalene; vinyl anthrycene; and so forth. Preferred monoalkenyl arenes are styrene and p-methyl styrene. The conjugated diene blocks may include homopolymers of conjugated diene monomers, copolymers of two or more conjugated dienes, and copolymers of one or more of the dienes with another monomer in which the blocks are predominantly conjugated diene units. Preferably, the conjugated dienes contain from 4 to 8 carbon atoms, such as 1,3 butadiene (butadiene); 2-methyl-1,3 butadiene; isoprene; 2,3 dimethyl-1,3 butadiene; 1,3 pentadiene (piperylene); 1,3 hexadiene; and so forth.

The amount of monoalkenyl arene (e.g., polystyrene) blocks may vary, but typically constitute from about 8 wt. % to about 55 wt. %, in some aspects from about 10 wt. % to about 35 wt. %, and in some aspects, from about 25 wt. % to about 35 wt. % of the copolymer. Suitable block copolymers may contain monoalkenyl arene endblocks having a number average molecular weight from about 5,000 to about 35,000 and saturated conjugated diene midblocks having a number average molecular weight from about 20,000 to about 170,000. The total number average molecular weight of the block polymer may be from about 30,000 to about 250,000.

Particularly suitable thermoplastic elastomeric block copolymers are available from Kraton Polymers LLC of Houston, Tex. under the trade name KRATON™. KRATON™ polymers include styrene-diene block copolymers, such as styrene-butadiene, styrene-isoprene, styrene-butadiene-styrene, and styrene-isoprene-styrene. KRATON™ polymers also include styrene-olefin block copolymers formed by selective hydrogenation of styrene-diene block copolymers. Examples of such styrene-olefin block copolymers include styrene-(ethylene-butylene), styrene-(ethylene-propylene), styrene-(ethylene-butylene)-styrene, styrene-(ethylene-propylene)-styrene, styrene-(ethylene-butylene)-styrene-(ethylene-butylene), styrene-(ethylene-propylene)-styrene-(ethylene-propylene), and styrene-ethylene-(ethylene-propylene)-styrene. These block copolymers may have a linear, radial or star-shaped molecular configuration. Specific KRATON™ block copolymers include those sold under the brand names G 1652, G 1657, G 1730, MD6673, MD6703, MD6716, and MD6973. Various suitable styrenic block copolymers are described in U.S. Pat. Nos. 4,663,220, 4,323,534, 4,834,738, 5,093,422 and 5,304,599, which are hereby incorporated in their entirety by reference thereto for all purposes. Other commercially available block copolymers include the S-EP-S and S-E-E-P-S elastomeric copolymers available from Kuraray Company, Ltd. of Okayama, Japan, under the trade designation SEPTON™. Still other suitable copolymers include the S-I-S and S-B-S elastomeric copolymers available from Dexco Polymers of Houston, Tex. under the trade designation VECTOR™. Also suitable are polymers composed of an A-B-A-B tetrablock copolymer, such as discussed in U.S. Pat. No. 5,332,613 to Taylor, et al., which is incorporated herein in its entirety by reference thereto for all purposes. An example of such a tetrablock copolymer is a styrene-poly (ethylene-propylene)-styrene-poly(ethylene-propylene) ("S-EP-S-EP") block copolymer.

Nonetheless, while elastomeric polymers have thus far been described, a non-elastomeric polyolefin material, either alone or in combination with one or more of the above elastomers may be used in the skin layer, the core layer, or both the skin and core layer. For instance, when using a non-elastomeric polyolefin material, a non-blocking skin layer may be formed that does not inhibit the elastic efficiency of the composition. Thus, in one aspect, the non-elastomeric polyolefin may include generally inelastic polymers, such as conventional polyolefins, (e.g., polyethylene), low density polyethylene (LDPE), Ziegler-Natta catalyzed linear low density polyethylene (LLDPE), etc.), ultra low density polyethylene (ULDPE), polypropylene, polybutylene, etc.; polytetrafluoroethylene; polyesters, e.g., polyethylene terephthalate (PET), etc.; polyvinyl acetate; polyvinyl chloride acetate; polyvinyl butyral; acrylic resins, e.g., polyacrylate, polymethylacrylate, polymethylmethacrylate, etc.; polyamides, e.g., nylon; polyvinyl chloride; polyvinylidene chloride; polystyrene; polyvinyl alcohol; polyurethanes; polylactic acid; copolymers and mixtures thereof; and so forth. For instance, the skin layer(s) can include an LLDPE available from Dow Chemical Co. of Midland, Mich., such as DOWLEX™ 2517 or DOWLEX™ 2047, or a combination thereof, or Westlake Chemical Corp. of Houston, Tex. Furthermore, in one aspect, the non-blocking polyolefin material may be other suitable ethylene polymers, such as those available from The Dow Chemical Company under the designations ASPUN™ (LLDPE) and ATTANE™ (ULDPE).

A single polymer as discussed above can be used to form the fibers from which the nonwoven web material is comprised, and when utilized, can be utilized in amount up to 100 wt. % based on the total weight of the nonwoven web material, such as from about 75 wt. % to about 99 wt. %, such as from about 80 wt. % to about 98 wt. %, such as from about 85 wt. % to about 95 wt. %. However, in other aspects, the nonwoven web material can include two or more polymers from the polymers discussed above. For instance, monocomponent fibers from which the nonwoven web material can include fibers formed from an olefin homopolymer in an amount ranging from about 5 wt. % to about 80 wt. %, such as from about 10 wt. % to about 75 wt. %, such as from about 15 wt. % to about 70 wt. %, based on the total weight of the nonwoven web material. Meanwhile, the fibers can also include a derivative of an olefin polymer. For instance, the nonwoven web material can include an elastomeric semi-crystalline polyolefin or "plastomer" (e.g., an ethylene/α-olefin copolymer, a propylene/α-olefin copolymer, or a combination thereof); a thermoplastic elastomeric block copolymer; or a combination thereof in an amount ranging from about 20 wt. % to about 95 wt. %, such as from about 25 wt. % to about 90 wt. %, such as from about 30 wt. % to about 85 wt. % based on the total weight of the nonwoven web material.

In additional aspects, the fibers from which the nonwoven web material is formed can be multicomponent and can have a sheath-core arrangement or side-by-side arrangement. For instance, in a sheath-core multicomponent fiber arrangement, the sheath can include a blend of a polypropylene and a polypropylene-based plastomer, (e.g., VISTAMAXX™), while the core can include a blend of a polyethylene and a polyethylene-based plastomer (e.g., INFUSE™). On the other hand, the sheath can include a blend of a polyethylene and a polyethylene-based plastomer (e.g., INFUSE™), while the core can include a blend of a polypropylene and a polypropylene-based plastomer, (e.g., VISTAMAXX™). Further, in still other aspects, the core can include 100% of a polyethylene or a polypropylene homopolymer.

For instance, in some aspects, the fibers from which the nonwoven web material is formed can have a sheath-core arrangement where the sheath can include from about 20 wt. % to about 90 wt. %, such as from about 25 wt. % to about 80 wt. %, such as from about 30 wt. % to about 70 wt. % of an olefin homopolymer (e.g., polypropylene or polyethylene) based on the total weight of the sheath component of the multicomponent fiber. Meanwhile, the sheath can also include from about 10 wt. % to about 80 wt. %, such as from about 20 wt. % to about 75 wt. %, such as from about 30 wt. % to about 70 wt. % of an olefin-based plastomer (e.g., a polypropylene-based plastomer or an ethylene-based plastomer) based on the total weight of the sheath component of the multicomponent fiber.

In addition, the core can include from about 30 wt. % to about 100 wt. %, such as from about 40 wt. % to about 95 wt. %, such as from about 50 wt. % to about 90 wt. % of an olefin homopolymer (e.g., polypropylene or polyethylene) based on the total weight of the core component of the multicomponent fiber. Further, the core can include from about 0 wt. % to about 70 wt. %, such as from about 5 wt. % to about 60 wt. %, such as from about 10 wt. % to about 50 wt. % of an olefin-based plastomer (e.g., a polypropylene-based plastomer or an ethylene-based plastomer) based on the total weight of the core component of the fiber.

Further, the weight percentage of the sheath can range from about 10 wt. % to about 70 wt. %, such as from about 15 wt. % to about 65 wt. %, such as from about 20 wt. % to about 60 wt. %, based on the total weight of the fiber. Meanwhile, the weight percentage of the core can range from about 30 wt. % to about 90 wt. %, such as from about 35 wt. % to about 85 wt. %, such as from about 40 wt. % to about 80 wt. % based on the total weight of the fiber.

In addition, the fibers from which the nonwoven web material is formed can have a side-by-side arrangement where two fibers are coextruded adjacent each other. In such an aspect, the first side can include a polyethylene and a polyethylene-based plastomer, while the second side can include a polypropylene and a polypropylene-based plastomer. The polyethylene can be present in the first side in an amount ranging from about 30 wt. % to about 90 wt. %, such as from about 35 wt. % to about 80 wt. %, such as from about 40 wt. % to about 70 wt. % based on the total weight of the first side. Meanwhile, the polyethylene-based plastomer can be present in the first side in an amount ranging from about 20 wt. % to about 80 wt. %, such as from about 25 wt. % to about 70 wt. %, such as from about 30 wt. % to about 60 wt. % based on the total weight of the first side. In addition, the polypropylene can be present in the second side in an amount ranging from about 30 wt. % to about 90 wt. %, such as from about 35 wt. % to about 80 wt. %, such as from about 40 wt. % to about 70 wt. % based on the total weight of the second side. Meanwhile, the polypropylene-based plastomer can be present in the second side in an amount ranging from about 20 wt. % to about 80 wt. %, such as from about 25 wt. % to about 70 wt. %, such as from about 30 wt. % to about 60 wt. % based on the total weight of the second side.

With such fiber configurations as those discussed above, in some aspects, a propylene-ethylene copolymer can be utilized in either the sheath and/or the core or the first side and/or the second side to act as a compatibilizer and enhance bonding between the sheath and core. For instance, the propylene-ethylene copolymer can be present in the sheath in an amount ranging from about 0.5 wt. % to about 20 wt. %, such as from about 1 wt. % to about 15 wt. %, such as from about 2 wt. % to about 10 wt. % based on the total weight of the sheath. Alternatively, the propylene-ethylene copolymer can be present in the core in an amount ranging from about 0.5 wt. % to about 20 wt. %, such as from about 1 wt. % to about 15 wt. %, such as from about 2 wt. % to about 10 wt. % based on the total weight of the core.

Other additives may also be incorporated into the nonwoven web material, such as melt stabilizers, processing stabilizers, heat stabilizers, light stabilizers, antioxidants, heat aging stabilizers, whitening agents, antiblocking agents, viscosity modifiers, etc. Viscosity modifiers may also be employed, such as polyethylene wax (e.g., EPOLENE™ C-10 from Eastman Chemical). Phosphite stabilizers (e.g., IRGAFOS available from Ciba Specialty Chemicals of Tarrytown, N.Y. and DOVERPHOS available from Dover Chemical Corp. of Dover, Ohio) are exemplary melt stabilizers. In addition, hindered amine stabilizers (e.g., CHIMASSORB available from Ciba Specialty Chemicals) are exemplary heat and light stabilizers. Further, hindered phenols are commonly used as an antioxidant in the production of films. Some suitable hindered phenols include those available from Ciba Specialty Chemicals of under the trade name IRAGANOX™, such as IRGANOX™ 1076, 1010, or E 201. When employed, such additives (e.g., antioxidant, stabilizer, etc.) may each be present in an amount from about 0.001 wt. % to about 25 wt. %, in some aspects, from about 0.005 wt. % to about 20 wt. %, and in some aspects, from 0.01 wt. % to about 15 wt. % of the nonwoven web material.

Regardless of the polymer(s) selected, the material can be formed into monocomponent or multicomponent fibers and extruded or spun to form a nonwoven web used in a fabric of the present disclosure. Monocomponent fibers can be formed from a polymer or a blend of polymers as well as any optional components, which are compounded and then extruded from a single extruder. Meanwhile, multicomponent fibers can be formed from two or more polymers (e.g., bicomponent fibers) extruded from separate extruders, where one or more of the polymers can be compounded with a tackifier, although this is not required when one of the polymers exhibits inherent tackiness, such as VISTAMAXX™ polymers and INFUSE™ polymers. The polymers may be arranged in substantially constantly positioned distinct zones across the cross-section of the fibers. The components may be arranged in any desired configuration, such as sheath-core, side-by-side, pie, island-in-the-sea, three island, bull's eye, or various other arrangements known in the art, and so forth. Various methods for forming multicomponent fibers are described in U.S. Pat. No. 4,789, 592 to Taniguchi et al. U.S. Pat. No. 5,336,552 to Strack et al., U.S. Pat. No. 5,108,820 to Kaneko, et al., U.S. Pat. No. 4,795,668 to Kruege, et al., U.S. Pat. No. 5,382,400 to Pike, et al., U.S. Pat. No. 5,336,552 to Strack, et al., and U.S. Pat. No. 6,200,669 to Marmon, et al., which are incorporated herein in their entirety by reference thereto for all purposes. Multicomponent fibers having various irregular shapes may also be formed, such as described in U.S. Pat. No. 5,277,976 to Hogle, et al., U.S. Pat. No. 5,162,074 to Hills, U.S. Pat. No. 5,466,410 to Hills, U.S. Pat. No. 5,069,970 to Largman, et al., and U.S. Pat. No. 5,057,368 to Largman, et al., which are incorporated herein in their entirety by reference thereto for all purposes. In addition, hollow fibers are also contemplated by the present disclosure, and such fibers can reduce the amount of polymer required, as well as the basis weight of the resulting nonwoven web material.

Although the nonwoven web material can be formed from meltblown fibers as discussed above, it is also to be understood that the nonwoven web material can be formed from fibers formed by other methods than meltblowing, such as spunbonding. One advantage of forming the nonwoven web material by spunbonding is that higher molecular weight polymers can be utilized as compared to the polymers used to form a meltblown nonwoven web material because the size of the capillary dies used in spunbonding equipment is larger than in meltblowing equipment. However, it is also to be understood that in the case of forming a meltblown nonwoven web material, the size of the capillary of the melt blown die can be increased to accommodate high viscosity (e.g., high molecular weight. Generally, however, the melt flow rate of the polymers of the present disclosure can range from about 3 grams per 10 minutes to about 50 grams per 10 minutes when subjected to a load of 2160 grams at a temperature of 190° C. according to ASTM Test Method D1238-E. As such, in forming spunbond nonwoven web materials, polymers having higher viscosity and crystallinity can be used. For instance, polypropylene having a melt flow rate of from about 15 grams per 10 minutes to about 50 grams per 10 minutes, such as from about 20 grams per 10 minutes to about 35 grams per 10 minutes; olefinic block copolymer plastomers having a melt flow rate of from about 3 grams per 10 minutes to about 20 grams per 10 minutes, such as from about 10 grams per 10 minutes to about 15 grams per 10 minutes; and polyethylenes having a melt flow rate of from about 5 grams per 10 minutes to about 30 grams per 10 minutes, such as from about 10 grams per 10 minutes to about 25 grams per 10 minutes can be utilized.

Furthermore, after formation, the one or more of the nonwoven web layers may be post-bonded. A patterned bonding technique (e.g., thermal point bonding, ultrasonic bonding, etc.) is generally used in which the nonwoven web material is supplied to a nip defined by at least one patterned roll. Thermal point bonding, for instance, typically employs a nip formed between two rolls, at least one of which is patterned. Ultrasonic bonding, on the other hand, typically employs a nip formed between a sonic horn and a patterned roll. Regardless of the technique chosen, the patterned roll contains a plurality of raised bonding elements to bond the nonwoven web material. The size of the bonding elements may be specifically tailored to facilitate the formation of apertures in the nonwoven web material and enhance bonding between the fibers contained in the nonwoven web material. For example, the length dimension of the bonding elements may be from about 300 to about 5000 micrometers, in some aspects from about 500 to about 4000 micrometers, and in some aspects, from about 1000 to about 2000 micrometers. The width dimension of the bonding elements may likewise range from about 20 to about 500 micrometers, in some aspects from about 40 to about 200 micrometers, and in some aspects, from about 50 to about 150 micrometers. In addition, the "element aspect ratio" (the ratio of the length of an element to its width) may range from about 2 to about 100, in some aspects from about 4 to about 50, and in some aspects, from about 5 to about 20.

The pattern of the bonding elements is generally selected so that the nonwoven web material has a total bond area of less than about 50% (as determined by conventional optical microscopic methods), in some aspects, less than about 40%, and in some aspects, less than about 25%. The bond density is also typically greater than about 50 bonds per square inch, and in some aspects, from about 75 to about 500 pin bonds per square inch. One suitable bonding pattern for use in the present disclosure is known as an "S-weave" pattern and is described in U.S. Pat. No. 5,964,742 to McCormack, et al., which is incorporated herein in its entirety by reference thereto for all purposes. S-weave patterns typically have a bonding element density of from about 50 to about 500 bonding elements per square inch, and in some aspects, from about 75 to about 150 bonding elements per square inch. Another suitable bonding pattern is known as the "rib-knit" pattern and is described in U.S. Pat. No. 5,620,779 to Levy, et al., which is incorporated herein in its entirety by reference thereto for all purposes. Rib-knit patterns typically have a bonding element density of from about 150 to about 400 bonding elements per square inch, and in some aspects, from about 200 to about 300 bonding elements per square inch Yet another suitable pattern is the "wire weave" pattern, which has a bonding element density of from about 200 to about 500 bonding elements per square inch, and in some aspects, from about 250 to about 350 bonding elements per square inch. Other bond patterns that may be used in the present disclosure are described in U.S. Pat. No. 3,855,046 to Hansen et al.; U.S. Pat. No. 5,962,112 to Haynes et al.; U.S. Pat. No. 6,093,665 to Sayovitz et al.; U.S. Pat. No. D375,844 to Edwards, et al.; U.S. Pat. No. D428,267 to Romano et al.; and U.S. Pat. No. D390,708 to Brown, which are incorporated herein in their entirety by reference thereto for all purposes.

The selection of an appropriate bonding temperature (e.g., the temperature of a heated roll) will help melt and/soften nonwoven web material at regions adjacent to the bonding elements. The softened nonwoven web material may then flow and become displaced during bonding, such as by pressure exerted by the bonding elements.

To achieve bond formation without substantially softening the polymer(s) of the nonwoven web material, the bonding temperature and pressure may be selectively controlled. For example, one or more rolls may be heated to a surface temperature of from about 50° C. to about 160° C., in some aspects from about 60° C. to about 140° C., and in some aspects, from about 70° C. to about 120° C. Likewise, the pressure exerted by rolls ("nip pressure") during thermal bonding may range from about 75 to about 600 pounds per linear inch (about 1339 to about 10,715 kilograms per meter), in some aspects from about 100 to about 400 pounds per linear inch (about 1786 to about 7143 kilograms per meter), and in some aspects, from about 120 to about 200 pounds per linear inch (about 2143 to about 3572 kilograms per meter). Of course, the residence time of the materials may influence the particular bonding parameters employed.

Notwithstanding the polymers or formation method selected, the barrier fabric having two or more layers may have a basis weight ranging from about 5 gsm (i.e., grams per square meter) to about 300 gsm. For example, the seamless sheet material may have a basis weight ranging from about 10 gsm to about 250 gsm, such as about 15 gsm to about 200 gsm, such as about 20 gsm to about 100 gsm. Desirably, the material may have a basis weight ranging from about 5 gsm to about 75 gsm, regardless of the number of layers, which will be discussed in greater detail below.

Figure 2A:
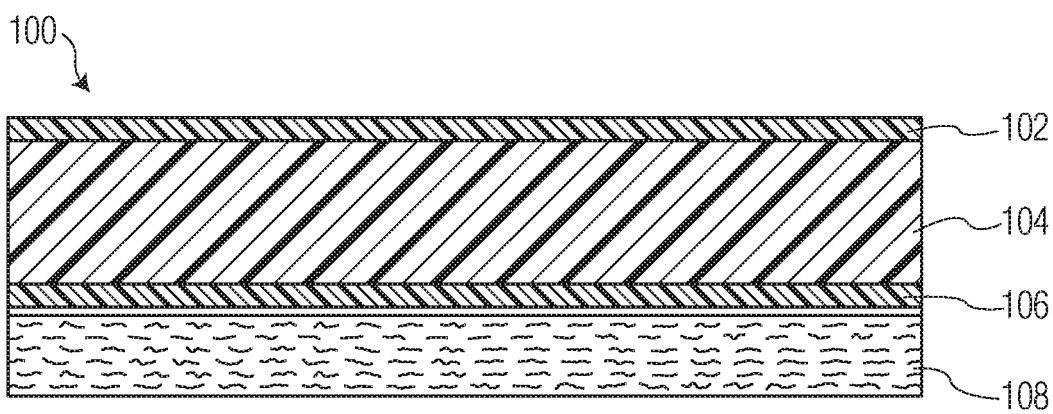
FIGS. 2A and 2B illustrate a cross section of a fabric according to the present disclosure.
Figure 2B:
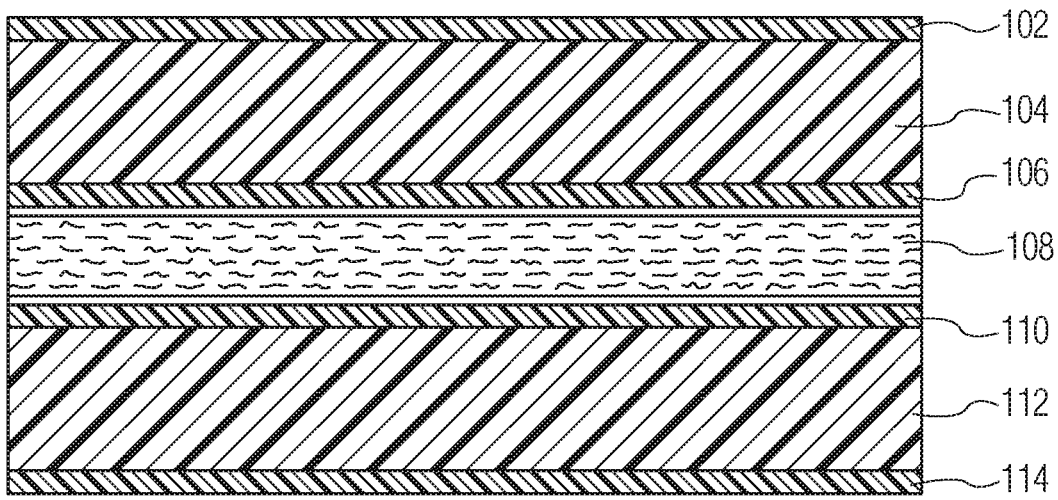

Regardless of whether the nonwoven web is a meltblown or spunbond web, as discussed above, the fibers of at least an inner layer of the two or more layer laminate includes a wettability agent in addition to the above discussed polymer (s). However, as will be discussed below, the present disclosure also contemplates the use of SF laminates (e.g. spunbond or SMS—Film, see FIG. 2A), and SFS (e.g. spunbond or SMS—film—spunbond or SMS, see FIG. 2B). Referring to FIG. 2A, a SF laminate may contain an inner spunbond layer 102, a meltblown layer 104, and an outer spunbond layer 106 that is adhered to a film 108. In such an aspect, the inner layer and/or meltblown layer 104 contain a wettability agent incorporated into the fibers of the nonwoven as a melt additive or as a topical treatment. Of course, as noted above, in one aspect, a SF laminate may also include an orientation that includes an inner spunbond layer 102 adhered directly to a film 108 (not shown). In such an aspect, the inner spunbond layer includes the wettability agent, and the film is free of the wettability agent, and instead, may be generally hydrophobic. Furthermore, referring to FIG. 2B, a SFS laminate may include a configuration similar to the SF laminate, and contain an inner spunbond layer 102, a meltblown layer 104, and an outer spunbond layer 106 that is adhered to a film 108, where the inner layer 102 and/or meltblown layer 104 contain a wettability agent incorporated into the nonwoven as a melt additive or as a topical treatment. However, the SFS laminate may further include a second SMS laminate adhered to the side of the film opposite the side adhered to outer spunbond layer 106. In such an aspect, a spunbond layer 110 may be adhered to the film 108, and be adjacent to a second meltblown layer 112, and a second outer spunbond layer 114. However, in such an aspect, only one or more of SMS layers 102, 104, and 106, on the portion of the laminate facing the wearer may contain the wettability agent, and the film and outer SMS layers 110, 112, and 114, may be generally free of the wettability agent, and instead may be generally hydrophobic.

Figure 3A:
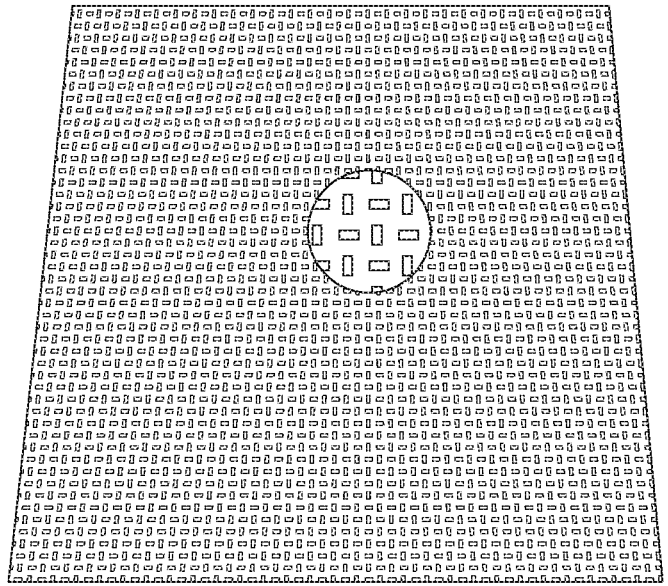
FIGS. 3A and 3B illustrate a fabric according to the present disclosure.
Figure 3B:
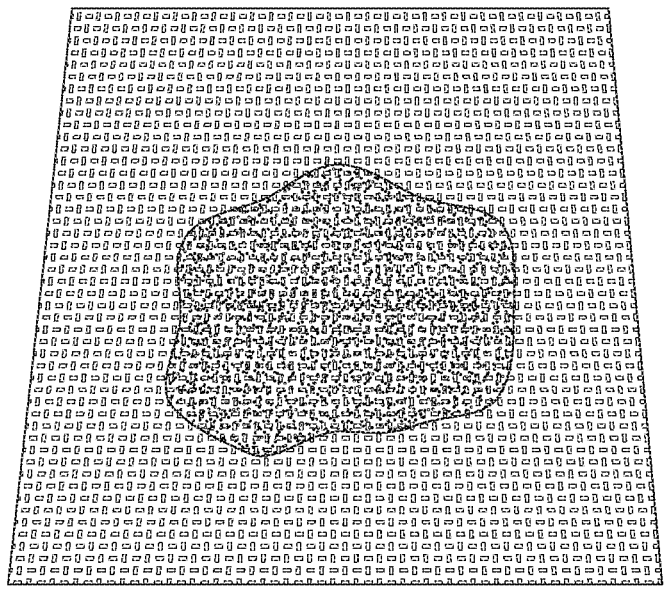

For instance, referring to FIGS. 3A and 3B, the unexpected properties of a fabric according to the present disclosure are illustrated. Particularly, FIG. 3A shows a drop of liquid on an outer side of the fabric (outer spunbond layer that is opposite the side facing the wearer). As shown, the outer side of the fabric exhibits excellent hydrophobicity to liquids, such as discussed above. Conversely, FIG. 3B shows the inner side of the same fabric (e.g. side of the fabric facing the wearer). As shown in FIG. 3B, the inner side of the fabric exhibits excellent wetting properties so as to wick moisture away from the body of a wearer. This was surprising as the fabric displays both good wettability on a portion facing the wearer, while maintaining good barrier properties at an exterior facing portion.

Regardless of the number of layers that the wettability agent is incorporated into, the present disclosure has found that the wettability agent may modify the surface energies of the hydrophobic fabric materials utilizing wetting agents. Furthermore, in one example, the layer including the wetting agent may also undergo surface modification techniques (e.g. corona discharge treatments, chemical etches, coatings, and the like) to further improve the surface energy of the material to render it more hydrophilic. As previously discussed, the wetting agent of the present disclosure is incorporated as a melt additive during formation of the layer or as a topical treatment of the fabric after formation. On such example of a topical treatment includes a foam application, but may also include other topical applications that restrict the wettability agent to only the desired of the portion, such that the wettability agent does not penetrate throughout the entire fabric. Particularly, the present disclosure has found that the improvement in wettability while maintaining barrier properties is more effective or pronounced when incorporated as a melt additive or as a topical treatment, as compared to spraying or otherwise externally applying the wettability agent in a manner that does not control the degree of penetration of the additive (e.g. that may extend through the entire fabric).

Nonetheless, the wettability agent may be a surfactant, such as an anionic, nonionic, or cationic surfactant. Examples of anionic surfactants include sodium dodecyl sulfate (SDS) and sodium stearate, examples of cationic surfactants include alkyl quaternary ammonium (quats) and alkyl pyridinium compounds, and examples of nonionic surfactants are ethoxylated alcohols and ethoxylated siloxanes. In one aspect, the wettability agent may be a silicone, an alkoxylated alkylphenol, or combinations thereof. Furthermore, in one aspect, the wettability agent may be a modified dimethylsiloxane, or a silicone-glycol copolymer, such as a polyethylene glycol-dimethicone.

Regardless of the wettability additive selected, the wettability agent may be included in the innermost layer of the nonwoven fabric, and/or in a middle layer of a fabric as described above in an amount of about 0.1 wt. % to about 20 wt. % based upon the weight of the respective layer, such as about 0.5 wt. % to about 15 wt. %, such as about 1 wt. % to about 10 wt. %, such as about 1.5 wt. % to about 7.5 wt. %, or any ranges or values therebetween. Thus, in one aspect, where the wettability agent is incorporated as a melt additive, the weight percentages may also represent the weight percentage of the wettability additive in a layer of a nonwoven fabric, such as, in one aspect, an innermost spunbond layer, and may therefore represent a percentage by weight based upon the components that form the fiber.

Nonetheless, in one aspect, such as an aspect that includes a SMS fabric or other orientation with two or more nonwoven layers, a second layer of the nonwoven fabric may also include an amount of about 0.1 wt. % to about 20 wt. % based upon the weight of the second layer, such as about 0.5 wt. % to about 15 wt. %, such as about 1 wt. % to about 10 wt. %, such as about 1.5 wt. % to about 7.5 wt. %, or any ranges or values therebetween. Similarly, in one aspect, the weight percentages may also represent the weight percentage of the wettability additive in the fibers of the second layer, such as, in one aspect, a weight percentage based upon the components of a meltblown fiber. In one aspect, the innermost layer and the second layer may include the same or different amounts by weight. Furthermore, in one aspect, the same amount of wettability agent may be incorporated into the fibers, but the end weight percentage may vary between the layers due to differences in the formation or components of the layer.

Furthermore, it should be understood that in one aspect, further layers may include the wettability agent, as long as the external layer remains generally free of wettability agent.

Regardless of the final orientation of layers, the present disclosure has found that the layer or layers including the wetting agent may have an absorption capacity, defined as the weight of a liquid that may be absorbed by the layer, of about 10% to about 1000% based upon the weight of the respective layer or layers, such as about 200% to about 900%, such as about 300% to about 800%, such as about 350% to about 750%, such as about 400% to about 700% absorption capacity, as measured according to STM-2401 (2019). Furthermore, in one aspect, the fabric may have an absorption capacity of about 50% to about 750%, such as about 100% to about 650%, such as about 150% to about 600%, such as about 200% to about 550%, such as about 250% to about 500%, or any ranges or values therebetween, based upon the weight of the entire fabric. Particularly, as should be understood, the absorption of the entire fabric may be less than the treated layer, as the fabric includes the hydrophobic external layer. Nonetheless, the wettable layer (s) and fabric as a while still exhibit excellent absorption properties while retaining good barrier function.

Additionally, the fabric may exhibit a max wetted radius of about 5 mm or greater, such as about 10 mm or greater, such as about 15 mm or greater, such as about 20 mm or greater, such as about 22.5 mm or greater, as measured according to AATCC 195 (2017).

The fabric may also exhibit a spreading speed of about 1 mm/sec or greater, such as about 1.5 mm/sec or greater, such as about 2 mm/sec or greater, such as about 2.5 mm/sec or greater, such as about 3 mm/sec or greater, such as about 3.5 mm/se or greater c, such as about 4 mm/sec or greater, as measured according to AATCC 195 (2017).

Nonetheless, as discussed above, in some aspects, the fabric may include, or be laminated to a film. Exemplary film layers include films formed from polymers which may include polyamides, polyolefins, polyesters, polyvinyl alcohols, polyurethanes, polyvinyl chlorides, polyfluorocarbons, polystyrenes, caprolactams, copolymers of ethylene and at least one vinyl monomer, copolymers of ethylene and n-butyl acrylate, and cellulosic and acrylic resins. If the film layer is made of a polyolefin, the polyolefin may be polyethylene, polypropylene, polybutene, ethylene copolymers, propylene copolymers and butene copolymers and blends of the above.

However, in one aspect, the film may also be an elastic film. The elastic film of the composite may be formed from one or more elastomeric polymers that are melt-processable, i.e. thermoplastic. Any of a variety of thermoplastic elastomeric polymers may generally be employed in the present disclosure, such as elastomeric polyesters, elastomeric polyurethanes, elastomeric polyamides, elastomeric copolymers, elastomeric polyolefins, and so forth. In one particular aspect, elastomeric semi-crystalline polyolefins are employed due to their unique combination of mechanical and elastomeric properties.

Semi-crystalline polyolefins have or are capable of exhibiting a substantially regular structure. For example, semi-crystalline polyolefins may be substantially amorphous in their undeformed state but form crystalline domains upon stretching. The degree of crystallinity of the olefin polymer may be from about 3% to about 30%, in some aspects from about 5% to about 25%, and in some aspects, from about 5% and about 15%. Likewise, the semi-crystalline polyolefin may have a latent heat of fusion ($\Delta H_f$), which is another indicator of the degree of crystallinity, of from about 15 to about 75 Joules per gram ("J/g"), in some aspects from about 20 to about 65 J/g, and in some aspects, from 25 to about 50 J/g. The semi-crystalline polyolefin may also have a Vicat softening temperature of from about 10° C. to about 100° C., in some aspects from about 20° C. to about 80° C., and in some aspects, from about 30° C. to about 60° C. The semi-crystalline polyolefin may have a melting temperature of from about 20° C. to about 120° C., in some aspects from about 35° C. to about 90° C., and in some aspects, from about 40° C. to about 80° C. The latent heat of fusion ($\Delta H_f$) and melting temperature may be determined using differential scanning calorimetry ("DSC") in accordance with ASTM D-3417 as is well known to those skilled in the art.

The Vicat softening temperature may be determined in accordance with ASTM D-1525.

Exemplary semi-crystalline polyolefins include ethylene/α-olefin copolymers, propylene/α-olefin copolymers, etc., such as described in more detail above. Of course, other thermoplastic polymers may also be used to form the elastic film, either alone or in conjunction with the semi-crystalline polyolefins. For instance, a substantially amorphous block copolymer may be employed that has at least two blocks of a monoalkenyl arene polymer separated by at least one block of a saturated conjugated diene polymer. The monoalkenyl arene blocks may include styrene and its analogues and homologues, such as o-methyl styrene; p-methyl styrene; p-tert-butyl styrene; 1,3 dimethyl styrene p-methyl styrene; etc., as well as other monoalkenyl polycyclic aromatic compounds, such as vinyl naphthalene; vinyl anthrycene; and so forth. Preferred monoalkenyl arenes are styrene and p-methyl styrene. The conjugated diene blocks may include homopolymers of conjugated diene monomers, copolymers of two or more conjugated dienes, and copolymers of one or more of the dienes with another monomer in which the blocks are predominantly conjugated diene units. Preferably, the conjugated dienes contain from 4 to 8 carbon atoms, such as 1,3 butadiene (butadiene); 2-methyl-1,3 butadiene; isoprene; 2,3 dimethyl-1,3 butadiene; 1,3 pentadiene (piperylene); 1,3 hexadiene; and so forth.

The amount of monoalkenyl arene (e.g., polystyrene) blocks may vary, but typically constitute from about 8 wt. % to about 55 wt. %, in some aspects from about 10 wt. % to about 35 wt. %, and in some aspects, from about 25 wt. % to about 35 wt. % of the copolymer. Suitable block copolymers may contain monoalkenyl arene endblocks having a number average molecular weight from about 5,000 to about 35,000 and saturated conjugated diene midblocks having a number average molecular weight from about 20,000 to about 170,000. The total number average molecular weight of the block polymer may be from about 30,000 to about 250,000.

Particularly suitable thermoplastic elastomeric copolymers are available from Kraton Polymers LLC of Houston, Tex. under the trade name KRATON®. KRATON® polymers include styrene-diene block copolymers, such as styrene-butadiene, styrene-isoprene, styrene-butadiene-styrene, and styrene-isoprene-styrene. KRATON® polymers also include styrene-olefin block copolymers formed by selective hydrogenation of styrene-diene block copolymers. Examples of such styrene-olefin block copolymers include styrene-(ethylene-butylene), styrene-(ethylene-propylene), styrene-(ethylene-butylene)-styrene, styrene-(ethylene-propylene)-styrene, styrene-(ethylene-butylene)-styrene-(ethylene-butylene), styrene-(ethylene-propylene)-styrene-(ethylene-propylene), and styrene-ethylene-(ethylene-propylene)-styrene. These block copolymers may have a linear, radial or star-shaped molecular configuration. Specific KRATON® block copolymers include those sold under the brand names G 1652, G 1657, G 1730, MD6673, and MD6973. Various suitable styrenic block copolymers are described in U.S. Pat. Nos. 4,663,220, 4,323,534, 4,834,738, 5,093,422 and 5,304,599, which are hereby incorporated in their entirety by reference thereto for all purposes. Other commercially available block copolymers include the S-EP-S elastomeric copolymers available from Kuraray Company, Ltd. of Okayama, Japan, under the trade designation SEPTON®. Still other suitable copolymers include the S-I-S and S-B-S elastomeric copolymers available from Dexco Polymers of Houston, Tex. under the trade designation VECTOR®. Also suitable are polymers composed of an A-B-A-B tetrablock copolymer, such as discussed in U.S. Pat. No. 5,332,613 to Taylor, et al., which is incorporated herein in its entirety by reference thereto for all purposes. An example of such a tetrablock copolymer is a styrene-poly(ethylene-propylene)-styrene-poly(ethylene-propylene) ("S-EP-S-EP") block copolymer.

The amount of elastomeric polymer(s) employed in the film may vary but is typically about 30 wt. % or more of the film, in some aspects about 50 wt. % or more, and in some aspects, about 80 wt. % or more of the of the film. In one aspect, for example, the semi-crystalline polyolefin(s) constitute about 70 wt. % or more of the film, in some aspects about 80 wt. % or more of the film, and in some aspects, about 90 wt. % or more of the film. In other aspects, blends of semi-crystalline polyolefin(s) and elastomeric block copolymer(s) may be employed. In such aspects, the block copolymer(s) may constitute from about 5 wt % to about 50 wt. %, in some aspects from about 10 wt. % to about 40 wt. %, and in some aspects, from about 15 wt. % to about 35 wt. % of the blend. Likewise, the semi-crystalline polyolefin(s) may constitute from about 50 wt. % to about 95 wt. %, in some aspects from about 60 wt. % to about 90 wt. %, and in some aspects, from about 65 wt. % to about 85 wt. % of the blend. It should of course be understood that other elastomeric and/or non-elastomeric polymers may also be employed in the film.

Besides polymers, the film may also contain other components as is known in the art. In one aspect, for example, the film contains a filler. Fillers are particulates or other forms of material that may be added to the film polymer extrusion blend and that will not chemically interfere with the extruded film, but which may be uniformly dispersed throughout the film. Fillers may serve a variety of purposes, including enhancing film opacity and/or breathability (i.e., vapor-permeable and substantially liquid-impermeable). For instance, filled films may be made breathable by stretching, which causes the polymer to break away from the filler and create microporous passageways. Breathable microporous elastic films are described, for example, in U.S. Pat. Nos. 5,997,981; 6,015,764; and 6,111,163 to McCormack, et al.; U.S. Pat. No. 5,932,497 to Morman, et al.; U.S. Pat. No. 6,461,457 to Taylor, et al.

The fillers may have a spherical or non-spherical shape with average particle sizes in the range of from about 0.01 to about 10 microns, such as about 0.05 to about 7.5 microns, such as about 0.1 to about 5 microns, or any ranges or values therebetween. Examples of suitable fillers include, but are not limited to, calcium carbonate, various kinds of clay, silica, alumina, barium carbonate, sodium carbonate, magnesium carbonate, talc, barium sulfate, magnesium sulfate, aluminum sulfate, titanium dioxide, zeolites, cellulose-type powders, kaolin, mica, carbon, calcium oxide, magnesium oxide, aluminum hydroxide, pulp powder, wood powder, cellulose derivatives, chitin and chitin derivatives. A suitable coating, such as stearic acid, may also be applied to the filler particles if desired. When utilized, the filler content may vary, such as from about 5 wt. % to about 75 wt. %, from about 10 wt. % to about 70 wt. %, from about 15 wt. % to about 65 wt. %, from about 20 wt. % to about 60 wt. %, from about 25 wt. % to about 55 wt. %, and in some aspects, from about 30 wt. % to about 50 wt. % of the film. However, it should be acknowledged that, in certain circumstances, the amount of filler and/or the size of the filler may be limited in order to maintain adequate barrier properties. For instance, in one aspect, the filler may be selected to have a micro or nano size, or to yield a nano-scale pore in the film to allow breathability while substantially maintaining liquid barrier properties. Nonetheless, in one aspect, films used in a laminate according to the present disclosure may be generally breathable as defined above. However, in one aspect, films according to the present disclosure may be, or generally be, non-breathable or non-transmittable while still permitting wicking by the inner layer(s) as discussed herein.

Other additives may also be incorporated into the film, such as melt stabilizers, processing stabilizers, heat stabilizers, light stabilizers, antioxidants, heat aging stabilizers, whitening agents, antiblocking agents, bonding agents, tackifiers, viscosity modifiers, etc. Examples of suitable tackifier resins may include, for instance, hydrogenated hydrocarbon resins. REGALREZ™ hydrocarbon resins are examples of such hydrogenated hydrocarbon resins and are available from Eastman Chemical. Other tackifiers are available from ExxonMobil under the ESCOREZ™ designation. Viscosity modifiers may also be employed, such as polyethylene wax (e.g., EPOLENE™ C-10 from Eastman Chemical). Phosphite stabilizers (e.g., IRGAFOS available from Ciba Specialty Chemicals of Terrytown, N.Y. and DOVERPHOS available from Dover Chemical Corp. of Dover, Ohio) are exemplary melt stabilizers. In addition, hindered amine stabilizers (e.g., CHIMASSORB available from Ciba Specialty Chemicals) are exemplary heat and light stabilizers. Further, hindered phenols are commonly used as an antioxidant in the production of films. Some suitable hindered phenols include those available from Ciba Specialty Chemicals of under the trade name "Irganox®", such as Irganox® 1076, 1010, or E 201. Moreover, bonding agents may also be added to the film to facilitate bonding of the film to additional materials (e.g., nonwoven web). When employed, such additives (e.g., tackifier, antioxidant, stabilizer, etc.) may each be present in an amount from about 0.001 wt. % to about 25 wt. %, in some aspects, from about 0.005 wt. % to about 20 wt. %, and in some aspects, from 0.01 wt. % to about 15 wt. % of the film.

The film may be mono- or multi-layered. Multilayer films may be prepared by co-extrusion of the layers, extrusion coating, or by any conventional layering process. Such multilayer films normally contain at least one base layer and at least one skin layer but may contain any number of layers desired. For example, the multilayer film may be formed from a base layer and one or more skin layers, wherein the base layer is formed from a semi-crystalline polyolefin. In such aspects, the skin layer(s) may be formed from any film-forming polymer. If desired, the skin layer(s) may contain a softer, lower melting polymer or polymer blend that renders the layer(s) more suitable as heat seal bonding layers for thermally bonding the film to a nonwoven web. For example, the skin layer(s) may be formed from an olefin polymer or blends thereof, such as described above. Additional film-forming polymers that may be suitable for use with the present disclosure, alone or in combination with other polymers, include ethylene vinyl acetate, ethylene ethyl acrylate, ethylene acrylic acid, ethylene methyl acrylate, ethylene normal butyl acrylate, nylon, ethylene vinyl alcohol, polystyrene, polyurethane, and so forth.

The properties of the resulting film may generally vary as desired. For instance, prior to stretching, the film typically has a basis weight of about 100 grams per square meter or less, and in some aspects, from about 50 to about 75 grams per square meter. Upon stretching, the film typically has a basis weight of about 60 grams per square meter or less, and in some aspects, from about 5 to about 35 grams per square meter. The stretched film may also have a total thickness of from about 1 to about 100 micrometers, in some aspects, from about 10 to about 80 micrometers, and in some aspects, from about 20 to about 60 micrometers. Nonetheless, in one aspect, when the fabric includes or is laminated to a film, the entire laminate may also have a size as discussed above in regards to the basis weight of the nonwoven fabric.

Nonetheless, when a film is used, the composite is formed by laminating the nonwoven fabric to the elastic film. Lamination may be accomplished using a variety of techniques, such as by adhesive bonding, thermal point bonding, ultrasonic bonding, etc. The particular bond pattern is not critical to the present disclosure. One suitable bond pattern, for instance, is known as an "S-weave" pattern and is described in U.S. Pat. No. 5,964,742 to McCormack, et al. Another suitable bonding pattern is known as the "rib-knit" pattern and is described in U.S. Pat. No. 5,620,779 to Levy, et al. Yet another suitable pattern is the "wire weave" pattern, which bond density of from about 200 to about 500 bond sites per square inch, and in some aspects, from about 250 to about 350 bond sites per square inch. Of course, other bond patterns may also be used, such as described in U.S. Pat. No. 3,855,046 to Hansen et al.; U.S. Pat. No. 5,962,112 to Haynes et al.; U.S. Pat. No. 6,093,665 to Sayovitz et al.; U.S. Pat. No. D375,844 to Edwards, et al.; U.S. Pat. No. D428,267 to Romano et al.; and U.S. Pat. No. D390,708 to Brown. Furthermore, a bond pattern may also be employed that, similar to the spunbond web described above, contains bond regions that are generally oriented in the machine direction and have a size, aspect ratio, and/or arrangement such as described above. For example, the bond regions may have an aspect ratio of from about 2 to about 100, in some aspects from about 4 to about 50, and in some aspects, from about 5 to about 20.

Various aspects of one suitable lamination technique will now be described in more detail. For example, the raw materials of the film (e.g., elastomeric polymer) may be initially dry mixed together (i.e., without a solvent) and added to a hopper (not shown) of an extrusion apparatus. The raw materials may alternatively be blended with a solvent. In the hopper, the materials are dispersively mixed in the melt and compounded using any known technique, such as batch and/or continuous compounding techniques that employ, for example, a Banbury mixer, Farrel continuous mixer, single screw extruder, twin screw extruder, etc.

Any known technique may be used to form a film from the compounded material, including blowing, casting, flat die extruding, etc. In one particular aspect, the film may be formed by a blown process in which a gas (e.g., air) is used to expand a bubble of the extruded polymer blend through an annular die. The bubble is then collapsed and collected in flat film form. Processes for producing blown films are described, for instance, in U.S. Pat. No. 3,354,506 to Raley; U.S. Pat. No. 3,650,649 to Schippers; and U.S. Pat. No. 3,801,429 to Schrenk et al., as well as U.S. Patent Application Publication Nos. 2005/0245162 to McCormack, et al. and 2003/0068951 to Boggs, et al. For example, the compounded material can be supplied to the extrusion apparatus and then blown into nip rolls to form a single-layered precursor elastic film. The rolls may be kept at temperature sufficient to solidify and quench the precursor elastic film as it is formed, such as from about 20 to 60° C. If desired, the film may be stretched and thinned in the machine direction by passing it through a film-orientation unit or machine direction orienter ("MDO"), such as commercially available from Marshall and Willams, Co. of Providence, R.I. The MDO may have a plurality of stretching rolls that progressively stretch and thin the film in the machine direction. The film may be stretched in either single or multiple discrete stretching operations. The film may also be stretched in other directions. For example, the film may be clamped at its lateral edges by chain clips and conveyed into a tenter oven. In the tenter oven, the film may be drawn in the cross-machine direction to the desired stretch ratio by chain clips diverged in their forward travel.

The nonwoven facing may be supplied from a supply roll or simply formed in-line. Although not necessarily required, as discussed above, a second nonwoven facing can also be laminated to the film, which may be a nonwoven facing as described herein, as well as another type of nonwoven web material, film, foam, etc. Furthermore, in one aspect, the spunbond web can be necked during lamination to the elastic film so that the resulting composite is considered "neck bonded", however, in other aspects, no necking is performed. The elastic film may also be stretched, such as described above. If desired, such stretching may occur prior to lamination. Alternatively, the elastic film can be stretched during lamination to the nonwoven facing(s) so that the resulting composite is considered "stretch bonded." In yet other aspects, the spunbond web of the nonwoven facing(s) can be necked and the elastic film can be stretched during lamination so that the resulting composite is considered "necked stretch bonded." Regardless, thermal bonding techniques may be employed to laminate the facing(s) to the elastic film. For instance, the facing(s) may be directed to a nip defined between rolls for laminating to the elastic film. One or both of these rolls may contain a plurality of raised bonding elements and/or may be heated. Upon lamination, the elastic film is melt fused to the facing at a plurality of bond regions as described above.

Various additional potential processing and/or finishing steps known in the art, such as slitting, stretching, etc., may be performed without departing from the spirit and scope of the disclosure. It should be noted that due to its inherent cross-machine extensibility, the composite of the present disclosure need not be subjected to any additional post-formation procedures as is conventional. Nevertheless, such processes can be employed if so desired. For instance, the composite may optionally be mechanically stretched in the cross-machine and/or machine directions to enhance extensibility. In one aspect, the composite may be coursed through two or more rolls that have grooves in the CD and/or MD directions. Such grooved satellite/anvil roll arrangements are described in U.S. Patent Application Publication Nos. 2004/0110442 to Rhim, et al. and 2006/0151914 to Gerndt, et al. Besides the above-described grooved rolls, other techniques may also be used to mechanically stretch the composite in one or more directions. For example, the composite may be passed through a tenter frame that stretches the composite. Such tenter frames are well known in the art and described, for instance, in U.S. Patent Application Publication No. 2004/0121687 to Morman, et al. The composite may also be necked. Suitable techniques necking techniques are described in U.S. Pat. Nos. 5,336,545, 5,226, 992, 4,981,747 and 4,965,122 to Morman, as well as U.S. Patent Application Publication No. 2004/0121687 to Morman, et al.

Regardless of whether a film is used, or the number of nonwoven layers included in the fabric, or if a composite is used where the fabric is laminated to a film, forming at least a liner of the composite (e.g. at least one nonwoven layer is on an interior or wearer facing side of the film), the fabric or composition may be used in a variety of protective articles. Such articles may include coveralls, jackets, pants, gloves, shoe covers, head covers, and the like.

Figure 4:
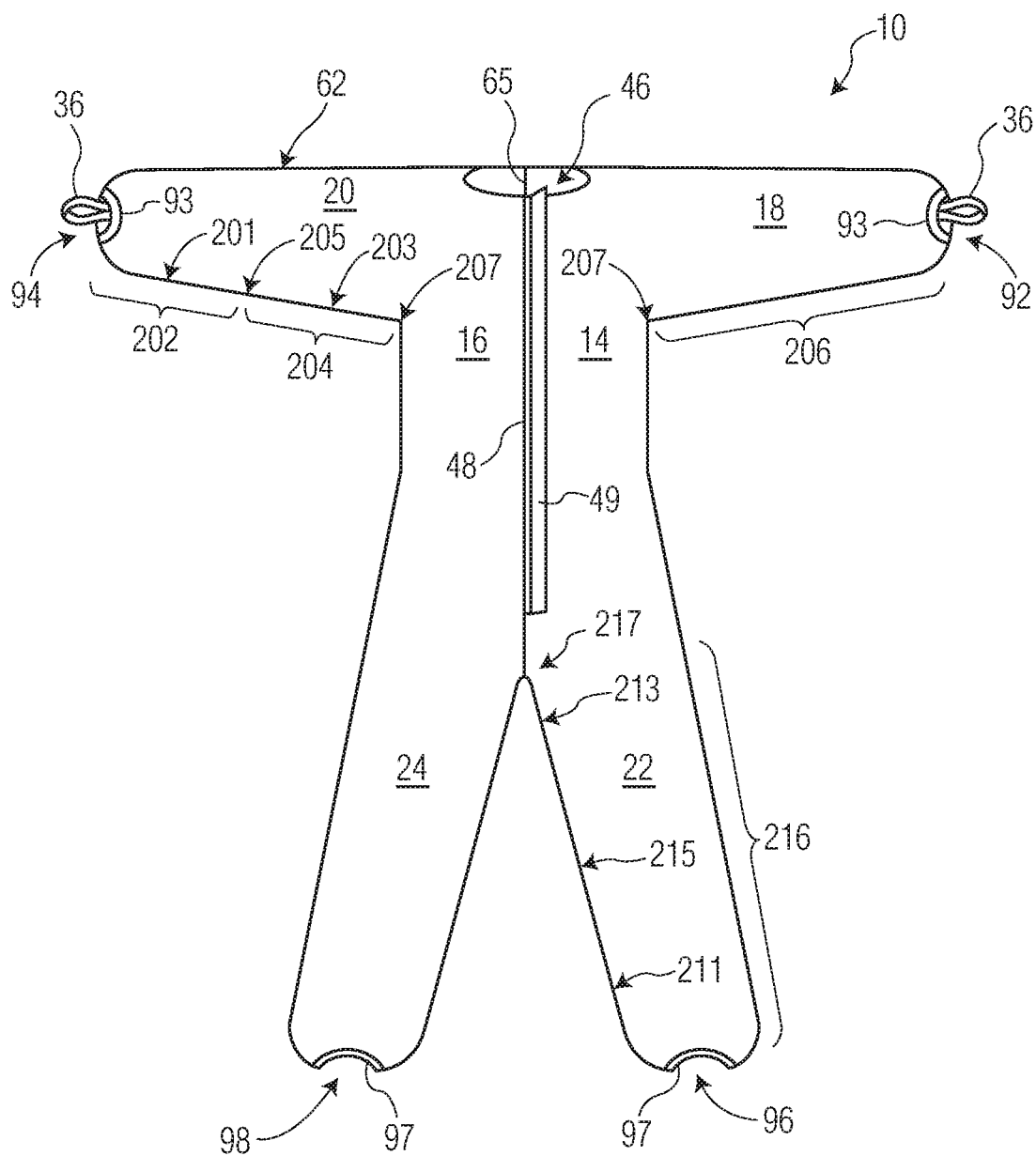
FIG. 4 illustrates a front view of an exemplary protective garment according to the present disclosure.

However, in one aspect, the article may be a coverall, such as generally shown in FIG. 4. In part, FIG. 4 illustrates one type of typical protective garment 10 that is contemplated by the present disclosure. A front view 12 of a garment 10 is shown in FIG. 4. The protective garment 10 includes a body portion made up of a left body panel 14 and a right body panel 16. It is desirable that each body panel 14, 16 is formed from a seamless sheet of material, however, in one aspect, one or more seams may be present. The right body panel 16 is substantially a mirror image of the left body panel 14. The protective garment 10 includes left and right sleeves 18, 20 as well as left and right legs 22, 24, each of which extends from the body portion 14, 16 of the garment 10. A neck opening 46 is visible at the top of the garment 10. As shown in FIGS. 1 and 4, a closure 48 extends from the neck opening 46 toward the crotch 217 of the garment 10.

The manufacture of such garments 10 may be in accordance with known automated, semi-automated, or hand assembly procedures. It is desired that the protective garment 10 contains the fewest practical number of panels, portions or sections in order to reduce the number of seams in the garment for better barrier properties and to simplify the manufacturing steps. However, it is contemplated that the protective garment 10 may contain sections, panels, or portions of barrier fabrics that may have different degrees of strength to customize the coverall for a particular application. For example, the sleeve portions 18, 20 or other portions (e.g., leg portions, shoulder portions or back portions of the coveralls) may include double layers of barrier fabrics with very high levels of strength and toughness. Examples of the type of garments 10 contemplated may be found in U.S. Pat. No. 5,487,189 to Bell, which is herein incorporated by reference, and in those garments available from Kimberly-Clark Corporation (Roswell, Ga.) sold under the KLEENGUARD® brand.

Desirably, the left sleeve 18 may be an integral part of the left body panel 14 (i.e., the left body panel 14 cut to form a left sleeve 18). It is contemplated that the left sleeve 18 may be a separate piece of material that may be joined to the upper left body panel 26 by a seam (not shown). In the same way, it is desirable that the right sleeve 20 may be an integral part of the right body panel 16 (i.e., the right body panel 16 cut to form a right sleeve 20). It is contemplated that the right sleeve 20 may be a separate piece of material that may be joined to the upper right body panel 28 by a seam (not shown). A closure 48 joins the left body panel 14 to the right body panel 16 on the front 10 of the garment 10, and may be a hook and loop closure, a zipper, or other closures known in the art. As shown in FIGS. 2 and 3, a vertical back seam 65 joins the body panels 14, 16 to each other on the back of the garment 10. The sleeves 18, 20 are desirably an integral part of the body portions 14, 16 and are formed with a seam 241 along the underside of the sleeve 18, 20 (see FIG. 6). Additionally, a horizontal back seam 67 joins a front portion of the upper body panels 26, 28 that extend over the shoulder 62 and to another portion of the body panels 14, 16 that extend around the sides of the garment 10 to the back side 13. However, it should be understood that, in one aspect, the back seam 67 may include a closure 48, and the closure 48 shown in FIG. 4 may instead be a seam (not shown).

In the garment 10 illustrated in FIG. 4, the sleeves 18, 20 are shown as extending outward from the body 14, 16 substantially parallel with the shoulder portions 62. However, other designs are possible. For example, the sleeves may be designed to extend upward from the general plane of the shoulder portions 62.

Desirably, the legs 22, 24 are formed in a way similar to the formation of the sleeves 18, 20. Desirably, the left leg 22 may be an integral part of the left body panel 14 (i.e., the left body panel 14 cut to form a left leg 22). It is contemplated that the left leg 22 may be a separate piece of material that may be joined to the left body panel 14 by a seam (not shown). In the same way, it is desirable that the right leg 24 may be an integral part of the right body panel 16 (i.e., the right body panel 16 cut to form a right leg 24). It is contemplated that the right leg 24 may be a separate piece of material that may be joined to the right body panel 16 by a seam (not shown).

Desirably, the left body panel 14 and the right body panel 16 are constructed such that the left and right upper sections 26, 28 and the left and right leg sections 22, 24 of the garment 10 corresponding to the left and right body panels 14, 16 are each made from single, or integral, pieces of material. Although less desirable, it is contemplated that seams (not shown) may be used to join the upper sections 26, 28 to the leg sections 22, 24, to join the sleeves 18, 20 to the upper sections 26, 28, or to join combinations thereof.

The seams used to form the garment 10 may be any type of seam that are appropriate in forming such garments. Such seams must be appropriate for the materials used in forming the garment 10, the strength required, and the level of security and protection that is desired. Typical seams used for such garments 10 include serged, sewn, bound, taped, welded, and heat sealed seams. Bound seams are often used in garments 10 as it uses a binding that reinforces the serged seam for strength and tear resistance as well as covers the raw edges of the materials being joined, to further reduce the possibility of introducing free fibers into the environments in which such garments 10 are to be used.

As shown in FIG. 4, the sleeves 18, 20 include wrist openings 92, 94 at the distal ends of the sleeves 18, 20. Each of the sleeves 18, 20 may include a donning loop 36 associated with the opening. Similarly, each of the legs 22, 24 may include a donning loop 36 associated with the ankle openings 96, 98 at the distal end of each of the legs 22, 24. For the particular garment 10 illustrated, the donning loop 36 associated with the wrists 92, 94 are thumb loops 37, while the donning loops 36 associated with the ankles 96, 98 are stirrups 38.

In one aspect of a garment 10 such as a coverall, each of the sleeves 18, 20 has a lower sleeve segment 201 and an upper sleeve segment 203. The lower sleeve segment 201 is a part of the sleeve 18, 20 distal to the body portions 14, 16 and proximate to the sleeve openings 92, 94. The upper sleeve segment 203 is a part of the sleeve 18, 20 proximate to the body portions 14, 16 and distal to the sleeve openings 92, 94. Together, the segment lengths 202, 204 of the lower sleeve segment 201 and the upper sleeve segment 203 account for the total length 206 of the sleeve. As a reference point, each sleeve 18, 20 has a sleeve midpoint 205 that is located at the point along each sleeve length 206, approximately equidistant from the sleeve opening 92, 94 and the underarm 207 of the garment 10. The underarm 207 being where each sleeve 18, 20 meets the body portions 14, 16 of the garment 10. The lower and upper sleeve segments 201, 203 may be equal in length, such that the lower sleeve segment 201 would be the portion of the sleeve 18, 20 that lies below the sleeve midpoint 205 and the upper sleeve segment 203 would resultantly be the portion of the sleeve 18, 20 that lies above the sleeve midpoint 205.

Alternatively, the lower and upper sleeve segments 201, 203 may have different lengths. The lower sleeve segment length 202 may be greater than the upper sleeve segment length 204. Alternatively, the lower sleeve segment length 202 may be less than the upper sleeve segment length 204. The upper sleeve segment length 302 may be approximately 25 percent or greater of the total sleeve length 206. In some aspects, the upper sleeve segment length 204 may be 33 percent or greater, 50 percent or greater, between 33 percent and 75 percent, or between 33 percent and 66 percent of the total sleeve length 206.

Similarly, each of the leg 22, 24 has a lower leg segment 211 and an upper leg segment 213. The lower leg segment 211 is a part of the leg 22, 24 distal to the body portions 14, 16 and proximate to the leg openings 96, 98. The upper leg segment 213 is a part of the leg 22, 24 proximate to the body portions 14, 16 and distal to the leg openings 96, 98. Together, the lengths 212, 214 of the lower leg segment 211 and the upper leg segment 213 account for the total length 216 of the leg. As a reference point, each leg 22, 24 has a leg midpoint 215 that is located at the point along the leg length 216, approximately equidistant from the leg opening 92, 94 and the crotch 217 of the garment 10. The crotch 217 being where each leg 22, 24 meets the body portions 14, 16 of the garment 10. The lower and upper leg segments 211, 213 may be equal in length, such that the lower leg segment 211 would be the portion of the leg 22, 24 that lies below the leg midpoint 215 and the upper leg segment 213 would resultantly be the portion of the leg 22, 24 that lies above the leg midpoint 215.

Alternatively, the lower and upper leg segments 211, 213 may have different lengths. The lower leg segment length 212 may be greater than the upper leg segment length 214. Alternatively, the lower leg segment length 212 may be less than the upper leg segment length 214. The upper leg segment length 214 may be approximately 25 percent or greater of the total leg length 216. In some aspects, the upper leg segment length 214 may be 33 percent or greater, 50 percent or greater, between 33 percent and 75 percent, or between 33 percent and 66 percent of the total leg length 216.

Furthermore, in one aspect, the circumference of the leg openings 96, 98 and the ankle elastic 97 used both be designed to provide a snug fit about the ankle of the wearer. For instance, the leg openings 96, 98 may have a circumference that is less than a circumference of the lower segments of each of the legs 22, 24 to achieve the snug fit about the ankles of the wearer Similarly, the circumference of the wrist openings 92, 93 and the wrist elastic 93 used both be designed to provide a snug fit about the wrist of the wearer, such as, the wrist openings 92, 93 may have a circumference that is less than a circumference of the lower segments of each of the sleeves 18, 20 to achieve the snug fit about the wrists of the wearer.

Regardless of the orientation of the garment, it has been found that by incorporating a wetting agent as a melt additive or topical treatment as discussed herein, the fabric, and any garment formed therefrom, may exhibit improved wetting and wicking, while maintaining adequate barrier properties.

The present disclosure may be better understood with reference to the following examples.

Test Methods

A polypropylene SMS fabric having a spunbond to meltblown ratio of about 80% to about 20% was formed. As a comparative example, the SMS fabric was used to form a coverall, an example of which may be KleenGuard® A20, with no wetting agent added. A test example was produced using the same SMS fabric, but including 3 wt. % of a nonionic wetting agent in the inner spunbond layer (wearer facing) as a melt additive, and 5 wt. % of a wetting agent in the meltblown layer as a melt additive. Initially, it was found that the test example had dust and liquid barrier properties similar to the comparative example, such that the text example still met type 6 qualifications, for example, ISO 17491-4 fabric qualifications for low level spray testing and.

Nonetheless, the test fabric was tested for absorption capacity, as well as liquid moisture management properties of textile fabrics for inner facing according to AATC 195 (2017). The results of which are shown in Table 1 below. As noted above, wetting speed, absorption rate, max wetted ratio, and spreading speed were measured according to AATCC 195 (2017). Additionally, drying speed was measured according to ISO 13029 (2019).

TABLE 1

| | Absorption Capacity % | Drying Speed (s/5 mL) | Wetting Speed (s) | Absorption Rate (%/s) | Max Wetted radius (mm) | Spreading Speed (mm/sec) |
|---|---|---|---|---|---|---|
| Test Fabric | 260% | 2640 | 3.7 | 53% | 23 mm | 4.1 |
| Comparative | 0 | 0 | 0 | 0 | 0 | 0 |

Additionally, the wetting and wicking properties of the test fabric and comparative fabric were tested by placing a coverall formed from the fabric onto a wearer and subjecting the wearer to a stress test. The wearer was placed into an atmosphere having a temperature of 35° C. and 55% relative humidity and asked to ride a bicycle for 10 minutes at level 4 (85 to 95 rpm for male, 65 to 75 rpm for female). Heartrate and body temperature of the subject were continuously monitored during the test and converted into a stress level score. Surprisingly, while the average heartrate and max heartrate were equivalent or higher for the subject while wearing the test fabric, the overall stress was 25% less, as the stress level wearing the comparative coverall was 51 where the test coverall was 38 at peak stress.

While the disclosure has been described in detail with respect to the specific aspects thereof, it will be appreciated that those skilled in the art, upon attaining an understanding of the foregoing, may readily conceive of alterations to, variations of, and equivalents to these aspects. Accordingly, the scope of the present disclosure should be assessed as that of the appended claims and any equivalents thereto.

What is claimed:

1. A wettable barrier fabric comprising:
   an inner first spunbond layer
   a meltblown layer, and
   an outer second spunbond layer;
   wherein the inner first spunbond layer and/or the meltblown layer is are comprised of fibers including a polymer and about 0.1 wt. % to about 20 wt. % of a wetting agent;
   wherein the wettable barrier fabric prevents at least 40% of dry particles having a size of about 0.1 microns or greater from passing through the fabric; and
   wherein the outer second spunbond layer is hydrophobic.

2. The wettable barrier fabric of claim 1, wherein the inner first spunbond layer and the meltblown layer are comprised of fibers including about 0.1 wt. % to about 5 wt. % of a wetting agent.

3. The wettable barrier fabric of claim 1, wherein the inner first spunbond layer, the meltblown layer, the outer second spunbond layer, or a combination thereof are comprised of polyolefin-based fibers and/or wherein the polymer of one or more of the inner first spunbond layer, meltblown layer, and the outer second spunbond layer is comprised of a propylene homopolymer, propylene/α-olefin copolymer, ethylene/α-olefin copolymer, or a combination thereof.

4. The wettable barrier fabric of claim 1, wherein the outer second spunbond layer is generally free of wetting agent.

5. The wettable barrier fabric of claim 1, wherein the outer second spunbond layer is laminated to a film.

6. The wettable barrier fabric of claim 1, wherein the inner first spunbond layer, the meltblown layer, or both the inner first spunbond layer and the meltblown layer have an absorption capacity of 10% to 1000% of the weight of the respective layer or layers and/or wherein the liquid spread speed of the inner first spunbond layer is about 1 mm/see or greater according to AATC 195 (2017).

7. The wettable barrier fabric of claim 1, wherein the wettable barrier fabric has a basis weight of about 5 grams per square meter (gsm) to about 300 gsm.

8. A protective garment, the protective garment being formed from a wettable barrier fabric including at least a first inner nonwoven layer, an outer layer, and a second inner layer between the first inner nonwoven layer and the outer layer that is a meltblown layer,
wherein the first inner nonwoven layer is comprised of fibers including a polymer and
about 0.1 wt. % to about 20 wt. % of a wetting agent and the second inner layer is comprised of fibers including a polyolefin and about 0.1 wt. % to about 20 wt. % of a wetting agent, and
wherein the outer layer is hydrophobic.

9. The protective garment of claim 8, wherein the outer layer is generally free of wetting agent, and/or wherein—the first inner nonwoven layer is a spunbond layer formed from fibers including the polymer and the wetting agent.

10. The protective garment of claim 8, wherein the outer layer is a film or a second spunbond layer.

11. The protective garment of claim 8, wherein the second inner layer comprises about 0.1 wt. % to about 5 wt. % of a wetting agent.

12. The protective garment of claim 8, wherein the protective garment prevents at least 40% of dry particles having a size of about 0.1 microns or greater from passing through the protective garment and/or wherein the protective garment has an absorption capacity of about 50% to about 500% based upon the weight of the fabric.

13. The protective garment of claim 8, further comprising a second outer layer laminated to the first outer layer on a side opposite the first inner nonwoven layer, wherein the second outer layer is comprised of nonwoven fibers.

14. A wettable barrier fabric comprising:
an inner first spunbond layer,
an outer film layer, and
a second inner layer between the inner first spunbond layer and the outer film layer, where the second inner layer is a meltblown layer,
wherein the inner first spunbond layer is comprised of fibers including a polymer and about 0.1 wt. % to about 20 wt. % of a wetting agent; and
wherein the second inner layer is comprised of fibers including a polyolefin and about 0.1 wt. % to about 20 wt. % of a wetting agent; and
wherein the wettable barrier fabric prevents at least 40% of dry particles having a size of about 0.1 microns or greater from passing through the fabric; and
wherein the outer film layer is hydrophobic.

15. The wettable barrier fabric of claim 14, further comprising an outer spunbond layer located between the inner first spunbond layer and the outer film layer, or on a side of the outer film layer opposite the inner first spunbond layer.

16. The wettable barrier fabric of claim 15, further comprising at least one nonwoven layer disposed between the outer spunbond layer and the outer film layer, wherein the outer spunbond layer is disposed on the side of the outer film layer opposite the inner first spunbond layer.

17. The wettable barrier fabric of claim 14, wherein the wettable barrier fabric is an elastic laminate.

18. The wettable barrier fabric of claim 14, wherein the outer film layer is comprised of elastic fibers or strands.

19. The wettable barrier fabric of claim 14, wherein the outer second spunbond layer, the outer film layer, or both the outer second spunbond layer and the outer film layer are hydrophobic.

20. The wettable barrier fabric of claim 14, further comprising at least one nonwoven layer disposed between the first inner spunbond layer and the outer film layer.

21. The wettable barrier fabric of claim 14, wherein the inner first spunbond layer has an absorption capacity of 10% to 1000% of the weight of the respective layer or layers and/or wherein the liquid spread speed of the inner first spunbond layer is about 1 mm/see or greater according to AATC 195 (2017).

22. A protective garment, the protective garment being formed from a wettable barrier fabric according to claim 14.

23. The protective garment of claim 22, wherein the outer layer is generally free of wetting agent.

24. The protective garment of claim 22, wherein the first inner nonwoven layer is a spunbond layer formed from fibers including the polymer and the wetting agent.

25. The protective garment of claim 22, where wherein the second inner layer comprises about 0.1 wt. % to about 5 wt. % of a wetting agent.

26. The protective garment of claim 22, wherein the garment has an absorption capacity of about 50% to about 500% based upon the weight of the fabric.

27. The protective garment of claim 22, further comprising a second outer layer laminated to the outer film layer on a side opposite the first inner nonwoven layer, wherein the second outer layer is comprised of nonwoven fibers.

\* \* \* \* \*